United States Patent
Martin et al.

(10) Patent No.: US 10,296,857 B2
(45) Date of Patent: May 21, 2019

(54) METHOD FOR DETERMINING AND PROVIDING DISPLAY ANALYZING OF IMPACT SEVERITY OF EVENT ON A NETWORK

(71) Applicant: ELEMENTUM SCM (CAYMAN) LTD., Grand Cayman (KY)

(72) Inventors: Dana Burrows Martin, Sunnyvale, CA (US); Xiao Ying Lin, Fremont, CA (US); Miguel Pinilla, San Carlos, CA (US)

(73) Assignee: Elementum SCM (Cayman) Ltd., Grand Cayman (KY)

( * ) Notice: Subject to any disclaimer, the term of this patent is extended or adjusted under 35 U.S.C. 154(b) by 1120 days.

(21) Appl. No.: 14/579,769

(22) Filed: Dec. 22, 2014

(65) Prior Publication Data

US 2016/0048788 A1    Feb. 18, 2016

Related U.S. Application Data

(60) Provisional application No. 62/045,722, filed on Sep. 4, 2014, provisional application No. 62/039,202, filed on Aug. 19, 2014, provisional application No. 62/038,074, filed on Aug. 15, 2014.

(51) Int. Cl.

| | |
|---|---|
| *G06Q 10/06* | (2012.01) |
| *G06Q 10/08* | (2012.01) |
| *H04L 12/24* | (2006.01) |
| *H04L 29/08* | (2006.01) |

(Continued)

(52) U.S. Cl.

CPC ... *G06Q 10/06315* (2013.01); *G06Q 10/0635* (2013.01); *G06Q 10/08* (2013.01); *G06Q 50/28* (2013.01); *H04L 41/065* (2013.01); *H04L 41/12* (2013.01); *H04L 67/10* (2013.01);

(Continued)

(58) Field of Classification Search
None
See application file for complete search history.

(56) References Cited

U.S. PATENT DOCUMENTS

| | | | |
|---|---|---|---|
| 6,735,548 B1 | 5/2004 | Huang | |
| 8,370,184 B2 | 2/2013 | Fotteler | |
| 9,721,294 B1 * | 8/2017 | Vakil | G06Q 40/00 |

(Continued)

FOREIGN PATENT DOCUMENTS

| | | | | |
|---|---|---|---|---|
| EP | 0770967 A3 * | 12/1998 | | G06Q 10/06 |
| WO | WO-0247048 A2 * | 6/2002 | | G06Q 10/06 |
| WO | WO-2011014708 A1 * | 2/2011 | | G01S 5/0027 |

OTHER PUBLICATIONS

"Normalization by Standard Deviation": https://docs.tibco.com/pub/spotfire/7.0.0/doc/html/norm/norm_normalization_by_standard_deviation.htm.*

(Continued)

*Primary Examiner* — Thomas L Mansfield
*Assistant Examiner* — Derick J Holzmacher
(74) *Attorney, Agent, or Firm* — Hickman Palermo Becker Bingham LLP

(57) ABSTRACT

The present disclosure describes a communication device and server configured to provide a user a relative event impact map display depicting a plurality of items impacted by an event or a portion of a network impacted by the event. The network can not only be a supply and/or logistics chain but also a computer network, a telecommunications network, transportation network, and power grid.

14 Claims, 27 Drawing Sheets

(51) Int. Cl.
*G06Q 50/28* (2012.01)
*H04L 29/06* (2006.01)

(52) U.S. Cl.
CPC .............. *H04L 67/12* (2013.01); *H04L 67/42* (2013.01); *Y04S 40/164* (2013.01); *Y04S 40/166* (2013.01)

(56) References Cited

U.S. PATENT DOCUMENTS

| | | | |
|---|---|---|---|
| 2004/0044557 A1* | 3/2004 | Frech .................... | G06Q 10/06 434/219 |
| 2007/0024468 A1* | 2/2007 | Quandel ............ | G06Q 10/0635 340/968 |
| 2008/0172262 A1* | 7/2008 | An .................... | G06Q 10/0637 705/7.37 |
| 2008/0312987 A1* | 12/2008 | Damodaran ...... | G06F 17/30241 705/7.27 |
| 2009/0313562 A1* | 12/2009 | Appleyard .............. | H04L 41/22 715/764 |
| 2011/0050397 A1* | 3/2011 | Cova ...................... | G06Q 10/08 340/10.1 |
| 2011/0050423 A1* | 3/2011 | Cova ...................... | G06Q 10/08 340/572.1 |
| 2011/0050424 A1* | 3/2011 | Cova .................. | G06Q 10/0833 340/572.1 |
| 2011/0054979 A1* | 3/2011 | Cova ...................... | G06Q 10/06 705/7.37 |
| 2013/0080200 A1 | 3/2013 | Connolly et al. | |
| 2013/0197951 A1* | 8/2013 | Watson ................. | G06Q 10/06 705/7.12 |
| 2014/0018949 A1* | 1/2014 | Linton .................... | G06N 5/02 700/99 |
| 2014/0018950 A1 | 1/2014 | Linton et al. | |
| 2014/0019471 A1 | 1/2014 | Linton et al. | |
| 2014/0278728 A1* | 9/2014 | Hollenbach ........ | G06Q 10/0635 705/7.28 |
| 2016/0048789 A1 | 2/2016 | Jones et al. | |

OTHER PUBLICATIONS

"Normalization (statistics)": https://en.wikipedia.org/wiki/Normalization_(statistics).*
Goh, Rick Siow Mong, et al. "RiskVis: supply chain Visualization with Risk management and Real-time Monitoring." Automation Science and Engineering (CASE), 2013 IEEE International Conference on. IEEE, 2013 (Year: 2013).*
Palacio, Damien, Christian Sallaberry, and Mauro Gaio. "Normalizing spatial information to improve geographical information indexing and retrieval in digital libraries." Advances in Spatial Data Handling and GIS. Springer, Berlin, Heidelberg, 2012. 65-78. (Year: 2012).*
Wei, Hairui, Ming Dong, and Shuyu Sun. "Inoperability input-output modeling (IIM) of disruptions to supply chain networks." Systems Engineering 13.4 (2010). (Year: 2010).*
U.S. Appl. No. 14/579,800, filed Dec. 22, 2014, Jones et al.
U.S. Appl. No. 14/579,843, filed Dec. 22, 2014, Jones et al.
"Supply Risk Solutions Awarded Patent for Multi-Tier Supply Risk Management," PRWeb, Sep. 5, 2013, 3 pages.
Jones, U.S. Appl. No. 14/579,800, filed Dec. 22, 2014, Office Action, dated Apr. 20, 2017.
Jones, U.S. Appl. No. 14/579,800, filed Dec. 22, 2014, Office Action, dated Jun. 20, 2018.

* cited by examiner

US 10,296,857 B2

METHOD FOR DETERMINING AND PROVIDING DISPLAY ANALYZING OF IMPACT SEVERITY OF EVENT ON A NETWORK

CROSS REFERENCE TO RELATED APPLICATION

The present application claims the benefits of U.S. Provisional Application Ser. Nos. 62/038,074, filed Aug. 15, 2014; 62/039,202, filed Aug. 19, 2014, and 62/045,722, filed Sep. 4, 2014, all entitled "Method and System for Identifying Events Adversely Impacting Supply Chain Performance", each of which is incorporated herein by this reference in its entirety.

FIELD

The disclosure relates generally to automated systems for analyzing the impact of an event on a network.

BACKGROUND

The traditional structure of the business supply and/or logistics chain, which viewed supply and/or logistics chain management as a chain of events, is evolving, in response to the ever-complicated logistics of modern trade, commerce and communications, towards viewing supply and/or logistics chain management as a three-dimensional model. In other words, organizations no longer view supply networks as a linear relationship between raw materials and distributors. Rather, today's supply web resembles a three-dimensional construct, complete with a variety of suppliers, tiers and intermediaries that serve to fill in for one another in the event of a disruption.

Increasingly, how well a supply web creates and shares information not only defines how well the web holds together, how efficiently it operates, and how much value it adds but also determines the success or failure—as a group—of the manufacturing venture. Companies need to share supply metrics, timelines, demand and capacity data to enable the supply network to develop a common and aligned set of objectives, which can protect it against commodity pressures, volatility and individual failures. Sharing information can speed up supply and/or logistics chains while mitigating the inherent risks in doing so. This new model, with cost management at its core, can capture decades of best practices in a unified strategy for a new generation of companies and managers.

Although significant advances have been made towards establishing a three-dimensional supply chain by companies such as E2open™, GT Nexus™, and Resilinc™, problems remain. Many three-dimensional supply and/or logistics chains are fairly rigid and unable to respond dynamically to, let alone anticipate, adverse events. This can cause disruption in the supply and/or logistics chain and concomitant interruptions in the product distribution chain. They also fail to provide users with the supply and/or logistics chain information necessary to mitigate the impact of events quickly, efficiently, and effectively.

SUMMARY

These and other needs are addressed by the various aspects, embodiments, and/or configurations of the present disclosure. The present disclosure generally discloses a network management system that can display to a user information representing risk and/or impact associated with an event disrupting the network.

A communication device of a user can be provided that includes:
a microprocessor;
a display;
a memory comprising:
microprocessor executable instructions to provide a display containing a number of tiles, each tile corresponding one or more of a site, part, component, product, shipment, and enterprise in a selected supply and/or logistics chain, wherein one or more of an appearance, shape, location, and size of each tile indicates a significance of an impact of an event on the corresponding site, part, component, product, shipment, or enterprise.

A server in communication with the communication device can include:
a microprocessor;
a memory;
a network interface to receive incoming and send outgoing messages;
a buffer for temporary storage of incoming and send outgoing messages;
an interface driver to provide the control signals to effect operation of the network interface and buffer, wherein the memory comprises:
microprocessor executable instructions to provide, via the network interface, buffer, and interface driver and to a user's communication device, a display containing a number of tiles, each tile corresponding one or more of a site, part, component, product, shipment, and enterprise in a selected supply and/or logistics chain, wherein one or more of an appearance, shape, location, and size of each tile indicates a significance of an impact of an event on the corresponding site, part, component, product, shipment, or enterprise.

The event can be one or more of a natural disaster, weather pattern, political disruption, criminal action, act of violence, freight disruption, energy shortage, energy disruption, energy blackout, business disruption, a human and/or animal health event, and/or any other event that is external or internal to the supply and/or logistics chain (e.g. production quality issue, inventory stock shortage, manufacture system, device, or apparatus malfunction, or other event that demands or causes lead time within the supply and/or logistics chain).

The degree of impact can be based on one or more of an event associated risk assigned to the respective tile and a relative degree of impact of the event on the corresponding site, part, component, product, shipment, enterprise, selected order, revenue, profit, etc., compared to a degree of impact of the event on another of the corresponding site, part, component, product, shipment, enterprise, selected order, revenue, profit, etc. The impact calculation can be preconfigured and/or configured by or for customer requirements.

Ranking the impacted objects against each other can be done to know which impacted object is a more significant impact to a selected supply and/or logistics chain. This "relative" aspect takes this calculation from a generic risk analysis to a risk analysis configured for a particular set of circumstances and/or supply and/or logistics chain.

When the corresponding site, part, component, product, shipment, or enterprise is a site, each tile can provide a name and a number and/or identity of event impacted parts and/or products associated with the corresponding site.

When the corresponding site, part, component, product, shipment, or enterprise is a part, component, and/or product, each tile can provide a name of an enterprise supplying the corresponding part, component, and/or product and an identity and/or number of parts, components, and/or products impacted by the event.

When the corresponding site, part, component, product, shipment, or enterprise is a shipment, each tile can provide a name and a number and/or identity of event impacted parts and/or products associated with the corresponding shipment.

The display can be updated as the impact of the event is mitigated by a recalculation of the impact significance on each remaining site, part, component, product, shipment, or enterprise. When the impact of the event on the corresponding site, part, component, product, shipment, and enterprise is resolved, for example, the display can be updated by removing the resolved tile from the display and recalculating a relative significance of the impact assigned to the remaining tiles.

By interacting with a tile, a user can receive additional information on the corresponding site, part, component, product, shipment, or enterprise. The additional information can include one or more of an emergency contact for the corresponding at least one of a site, part, component, product, shipment, or enterprise, a comment area for entering comments regarding the corresponding site, part, component, product, shipment, or enterprise, and an update button, the update button allowing the user to add one or more additional tags representing any new information or status. The update button can also provide more specific details on the risk pertaining to a selected tile, such as revenue or profit at risk from the event, lead time required to mitigate the effects of the event, and alternative suppliers.

When the appearance, location and size of the tile is varied depending on the impact of the event one or more of the following rules can be applied:

(a) a tile location on the display depends on a number of products at risk per site based on the parts and sole sourced parts produced by a corresponding site impacted by the event, wherein a location on the display is determined by normalizing the corresponding site's products at risk count and determining a relative count;

(b) a size of the tile on the display depends on a profit and/or revenue generated from the products at risk for a corresponding site, the profit and/or revenue being generated from the products manufactured from the parts supplied by the corresponding impacted site, wherein the profit and/or revenue is aggregated and normalized across all at risk sites impacted by the event; and a color of the tile on the display depends an aggregate component lead time determined by the equation; [(inventory on-hand+inventory in-transit)/daily component consumption]=Adjusted lead time.

Each axis of the relative impact map can be configured to have different metrics based on the type of analysis being done. The location, size, and color of each tile can be determined by the risk outcomes determined by the customer.

A server can be provided that includes:

a microprocessor;

a memory comprising a set of data structures representing a supply and/or logistics chain, the set of data structures comprising nodes interconnected by branches, each node corresponding to one or more of (a) a site manufacturing and/or supplying a part, component, or product and (b) the part, component, or product, each branch describing a type of relationship between nodes interconnected by the respective branch;

a network interface to receive incoming and send outgoing messages;

a buffer for temporary storage of incoming and send outgoing messages; and an interface driver to provide the control signals to effect operation of the network interface and buffer, wherein the memory comprises:

microprocessor executable instructions to provide, via the network interface, buffer, and interface driver, a user's communication device with an impact chain display depicting only a portion of the set of data structures associated with one or more of a selected part, component, and product.

The display can include selectively the set of data structures responsible for making, using, and/or supplying the one or more of a selected part, component, and product.

The type of relationship can include a plurality of manufactured by, shipped to, sole source of, alternate part or component for, and component of.

The set of data structures can include human representatives of one or more selected sites.

This disclosure is intended to encompass the method of operation and tangible and non-transient computer readable medium containing microprocessor executable instructions to perform the operations of each of the communication device and server.

The present disclosure can provide a number of advantages depending on the particular aspect, embodiment, and/or configuration. The supply and/or logistics chain management system can, particularly for vertically integrated supply and/or logistics chains, more effectively and efficiently control suppliers, prices, product supply, and other terms, generate faster material turns or velocities, increase profit, enable leaner manufacturing and logistics operations, and reduce waste when compared to a supply and/or logistics chain without the supply and/or logistics chain management system. It can more effectively consider the impact of unanticipated or "black swan" events, including natural and manmade disasters, by monitoring news sources, law enforcement and military authorities, among others, and precisely map tier 1, 2, 3, and 4 facilities. It can effectively assess the sensitivity of the supply and/or logistics chain to various internal and external events. It can assess the risk of having a particular product or product component available at a selected location at a selected price or cost. It can enable greater levels of collaboration not only among the various tiers but also within tiers of the supply chain. It can enable more effective management of multiple sources, within a given tier, even for legally distinct, competitive entities. Ranking the items, impacted by an event, against one another enables the user to know which is a more significant impact to the corresponding supply and/or logistics chain. The "relative" aspect takes this algorithm from a generic risk analysis to a risk analysis configured for a selected set of circumstances. The system's combination of cloud tools, operating models, and risk management logic can create new, more profitable and effective business practices in three-dimensional supply and/or logistics chains.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Computer-readable medium" as used herein refers to any tangible and non-transient storage and/or transmission medium that participate in providing instructions to a processor for execution. Such a medium may take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium excludes transient storage media, particularly electrical, magnetic, electromagnetic, optical, magneto-optical signals.

A "database" is an organized collection of data held in a computer. The data is typically organized to model relevant aspects of reality (for example, the availability of specific types of inventory), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multivalue, semantic, and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented, and unstructured databases.

"Database management systems" (DBMSs) are specially designed applications that interact with the user, other applications, and the database itself to capture and analyze data. A general-purpose database management system (DBMS) is a software system designed to allow the definition, creation, querying, update, and administration of databases. Well-known DBMSs include MySQL™, PostgreSQL™, SQLite™, Microsoft SQL Server™ Microsoft Access™, Oracle™, SAP™, dBASE™, FoxPro™, and IBM DB2™. A database is not generally portable across different DBMS, but different DBMSs can inter-operate by using standards such as SQL and ODBC or JDBC to allow a single application to work with more than one database.

"Determine", "calculate" and "compute," and variations thereof, as used herein, are used interchangeably and include any type of methodology, process, mathematical operation or technique.

An "Electronic Product Code" (EPC) is designed as a universal identifier that provides a unique identity for every physical object anywhere in the world, for all time. Its structure is defined in the EPCglobal Tag Data Standard, which is an open standard freely available for download from the website of EPCglobal, Inc. The canonical representation of an EPC is a URI, namely the "pure-identity URI" representation that is intended for use when referring to a specific physical object in communications about EPCs among information systems and business application software. The EPCglobal Tag Data Standard also defines additional representations of an EPC identifier, such as the tag-encoding URI format and a compact binary format suitable for storing an EPC identifier efficiently within RFID tags (for which the low-cost passive RFID tags typically have limited memory capacity available for the EPC/UII memory bank). The EPCglobal Tag Data Standard defines the structure of the URI syntax and binary format, as well as the encoding and decoding rules to allow conversion between these representations. The EPC is designed as a flexible framework that can support many existing coding schemes, including many coding schemes currently in use with barcode technology. EPCs are not designed exclusively for use with RFID data carriers. They can be constructed based on reading of optical data carriers, such as linear bar codes and two-dimensional bar codes, such as Data Matrix symbols.

An "enterprise" refers to a business and/or governmental organization, such as a corporation, partnership, joint venture, agency, military branch, company, and the like.

"Enterprise resource planning" or ERP systems integrate internal and external management information across an entire organization, embracing finance/accounting, manufacturing, sales and service, customer relationship management, and the like. ERP systems automate this activity with an integrated software application. The purpose of ERP is to facilitate the flow of information between all business functions inside the boundaries of the organization and manage the connections to outside stakeholders.

"Means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

"Module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

An "original equipment manufacturer", or OEM, manufactures product or components that it sells to end users or another enterprise and retailed to end users under that purchasing enterprise's brand name. OEM generally refers to an enterprise that originally manufactured the final product for a purchaser, such as a consumer. For example, Ford™ and General Motors™ are OEM companies that manufacture cars, and Apple™ is a computer OEM. The brand owner may or may not be the OEM.

A "performance indicator" or "key performance indicator" ("KPI") is a type of performance measurement. An organization may use Is to evaluate its success, or to evaluate the success of a particular activity in which it is engaged.

"Real-time locating systems" or RTLS are used to automatically identify and track the location of objects or people in real time, usually within a building or other contained area. Wireless RTLS tags are attached to objects or worn by people, and in most RTLS, fixed reference points receive wireless signals from tags to determine their location. Examples of real-time locating systems include tracking automobiles through an assembly line, locating pallets of merchandise in a warehouse, or finding medical equipment in a hospital. The physical layer of RTLS technology is usually some form of radio frequency (RF) communication, but some systems use optical (usually infrared) or acoustic (usually ultrasound) technology instead of or in addition to RF. Tags and fixed reference points can be transmitters, receivers, or both, resulting in numerous possible technology combinations. RF trilateration can use estimated ranges from multiple receivers to estimate the location of a tag. RF triangulation uses the angles at which the RF signals arrive at multiple receivers to estimate the location of a tag.

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running Servers typically include a network interface to receive incoming and send outgoing messages, a buffer for temporary storage of incoming and send outgoing messages, and an interface driver to provide the control signals to effect operation of the network interface and buffer.

A "supply and/or logistics chain" refers typically to a tiered supply chain. The chain commonly links business functions and processes in the chain into an integrated business model. Each enterprise in a tier supplies an enterprise in the next highest tier and is in turn supplied by an enterprise in the next lowest tier. For example, a tier two company supplies a tier one company, a tier three company supplies a tier two company, and so on.

A "tier one enterprise" supplies parts or components directly to an original equipment manufacturer ("OEM"), which typically sets up the supply and/or logistics chain. A tier one enterprise commonly has the skills and resources to supply the parts or components that an OEM needs, including having established processes for managing suppliers in the tiers below them. In some applications, tier one enterprises provide a manufacturing service for the OEM, leaving the OEM to concentrate on final product assembly and/or marketing.

A "tier two enterprise" is a supplier to a tier one enterprise and generally do not supply parts or components directly to the OEM. A single enterprise, however, may be a tier one enterprise supplier to one company and a tier two enterprise supplier to another company or may be a tier one enterprise supplier for one product and a tier two enterprise supplier for a different product line. Similar rules apply for enterprises in other tiers, such as tier three enterprises, tier four enterprises, and so on. For example, tier three enterprise suppliers supply directly to tier two enterprises and tier four enterprise suppliers supply directly to tier three enterprises. In many supply and/or logistic chains, tier four enterprise suppliers are providers of basic raw materials, such as steel and glass, to higher-tier enterprise suppliers.

A "warehouse management system" (WMS) is a part of the supply and/or logistics chain and controls the movement and storage of materials or inventory within a warehouse and processes the associated transactions, including shipping, receiving, putaway and picking. The systems can also direct and optimize stock putaway based on real-time information about the status of bin utilization. A WMS monitors the progress of products through the warehouse. It involves the physical warehouse infrastructure, tracking systems, and communication between product stations. Commonly, warehouse management involves the receipt, storage and movement of goods, (normally finished goods), to intermediate storage locations or to a final customer. In the multi-echelon model for distribution, there may be multiple levels of warehouses. This includes a central warehouse, a regional warehouses (serviced by the central warehouse) and potentially retail warehouses (serviced by the regional warehouses). Warehouse management systems often utilize automatic identification and data capture technology, such as barcode scanners, mobile computers, wireless LANs and potentially radio-frequency identification (RFID), to efficiently monitor the flow of products. Once data has been collected, there is either a batch synchronization with, or a real-time wireless transmission to a central database. The database can then provide useful reports about the status of goods in the warehouse.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

The Supply and/or Logistics Chain Management System

Figure 1:
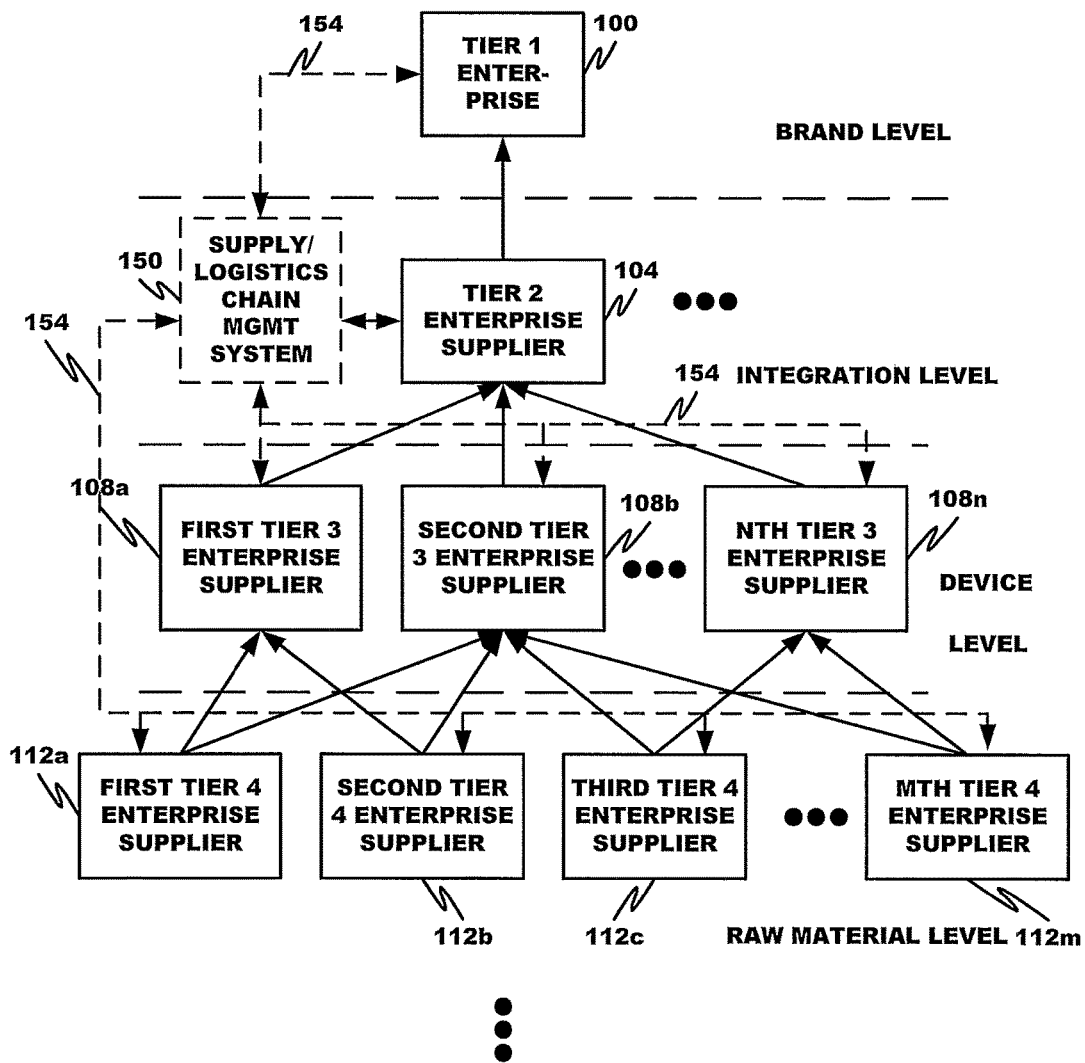
FIG. 1 is a block diagram of an exemplary three-dimensional supply and/or logistics chain.

The supply and/or logistics chain management system 150 will be discussed with reference to FIG. 1. FIG. 1 illustrates a simplified supply and/or logistics chain and is not intended to be limiting for purposes of this disclosure. Generally, parts and components of products are made from materials and/or other parts and components, and finished goods or products are made from materials, parts, and/or components. Materials are generally considered to be raw materials, or crude or processed materials or substances.

A tier 1 enterprise 100, in a brand level, typically corresponds to an OEM that is also a brand owner, such as a retail and/or wholesale vendor, supplier, distributor, or other business that provides its branded products to end users. These businesses typically invest in research and development, product design, marketing, and brand development. Examples include Ford™, General Motors™, Toyota™, Apple™, Amazon™, Cisco Systems, Inc.™, and Microsoft Corporation™. The tier 1 enterprise 100 monitors (and collects information regarding) the supply and/or logistics chain, product inventory levels, product demand, and/or prices of competitive products and, based on the collected information and product demand and price projections, dictates to second tier enterprise partners, prices, supply requirements, and other material terms, and accesses performance information of such second and third tier enterprise partners to monitor supply and/or logistics chain performance.

A tier 2 enterprise supplier 104, in an integration level, assembles parts and/or components received from tier 3 enterprise suppliers 108a-n into products, which are shipped, by the tier 2 enterprise supplier 104, to the tier 1 enterprise 100 for manufacture and sale of finished goods or products. As will be appreciated, the tier 1 enterprise 100 can be an OEM. Tier 2 enterprise supplier(s) 104 provide, to the supply and/or logistics chain management system 150, its respective supply and/or logistics chain performance information and/or supply and/or logistics chain performance information received from tier 3 part and/or component enterprise suppliers.

The first, second, . . . nth tier 3 enterprise suppliers 108a-n, at the device level, manufacture parts and/or components for assembly by the tier 2 enterprise supplier 104 into products. The first, second, . . . nth tier 3 part and/or enterprise suppliers 108a-n provide, to the supply and/or logistics chain management system 150 or to the tier 2 enterprise supplier 104 for provision to the supply and/or logistics chain management system 150, its supply and/or logistics chain respective performance information and supply and/or logistics chain performance information received from tier 4 enterprise suppliers 112a-m.

The first, second, third, . . . mth tier 4 enterprise suppliers 112a-m, at the raw material level, manufacture and supply to the first, second, . . . nth tier 3 enterprise suppliers 108a-n materials for use in manufacturing parts and components for supply to the tier 2 enterprise supplier. The first, second, third, . . . mth tier 4 material suppliers 112a-m provide, to the supply and/or logistics chain management system 150 or to the tier 3 enterprise suppliers for provision to the supply and/or logistics chain management system 150, its respective supply and/or logistics chain performance information.

As shown by the ellipses at the bottom of FIG. 1, additional tiers of enterprise suppliers can exist depending on the application and industry.

The brand, integration, device and raw material levels are for purposes of illustration only and are not necessarily associated with the depicted tier. For example, the brand level may or may not be associated with the tier 1 enterprise(s) 100; the integration level may or may not be associated with the tier 2 enterprise supplier(s) 104; the device level may or may not be associated with the tier 3 enterprise supplier(s) 108a-n; and the raw material level may or may not be associated with the tier 4 enterprise supplier(s) 112a-m.

Each of the tier 1 enterprise 100, tier 2 enterprise supplier 104, first, second, third, . . . nth tier 3 enterprise suppliers 108a-n, and first, second, third, . . . mth tier 4 enterprise suppliers 112a-m correspond to an enterprise, which may or may not be related to or affiliated with another enterprise in the supply and/or logistics chain of FIG. 1.

As shown by the arrows, air, land, and sea logistics providers link the various tier partners with an integrated network of air, sea, and ground capabilities to enable effective movement of materials, components, and products from sources (or points of origination) to destinations.

As will be appreciated, each tier 1, 2, 3 and 4 enterprise can have one or more sites where a supply and/or logistics chain activity occurs. The sites can, for example, be a manufacturing, processing, or treatment facility such as a factory or plant, storage facility such as a warehouse, distribution facility, mine, farm, ranch, or other agricultural facility, and the like. The various sites can be co-located or distributed depending on the application.

Figure 4:
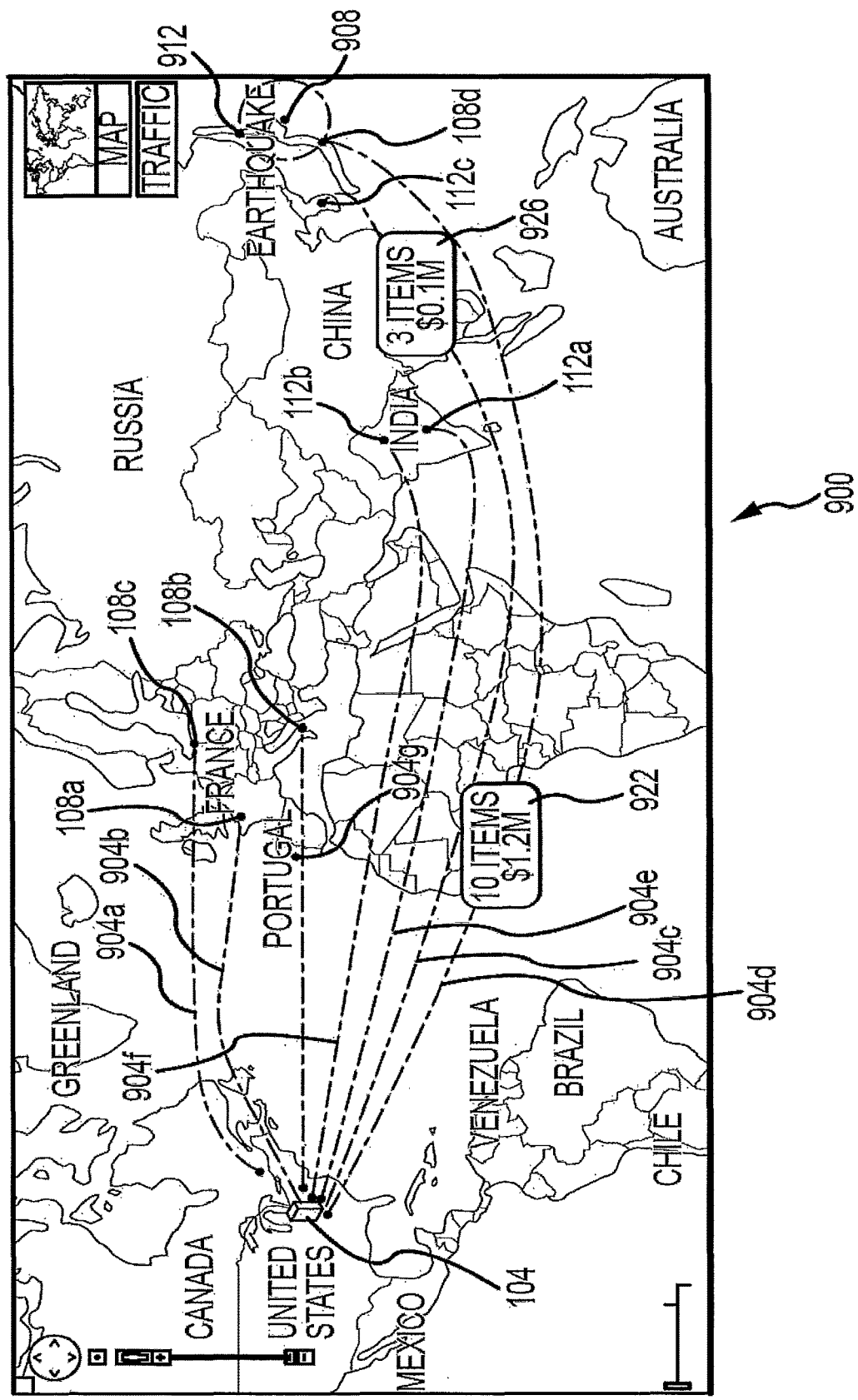
FIG. 4 depicts a globally distributed supply and/or logistics chain.

FIG. 4 (which can be a display outputted by the supply and/or logistics chain management system 150) is an illustration of a globally distributed supply and/or logistics chain 200. With reference to FIG. 4, locations of various supply and/or logistics chain sites, including the tier 2 enterprise supplier 104, first, second, . . . nth tier 3 enterprise suppliers 108a-n, and first, second, third, . . . mth tier 4 enterprise suppliers 112a-m. Material and/or part and/or component and/or product shipment lines 200a-g between the various related nodes can be shown. Different colors or shades of a common color or line patterns or shading can be assigned to each shipment line to indicate on-time shipments, slightly delayed shipments, moderately delayed shipments, and heavily delayed shipments. Moving a cursor over a node, shipment line, or event can cause a box or icon, such as shown by boxes 422 and 426, to appear providing relevant information about the associated one of the node, shipment line, or event. For example, relevant information about the node can include enterprise and/or organization name, materials and/or part and/or component and/or products supplied by the enterprise, and one-hop related enterprises (e.g., the supplier to the selected node and the purchaser from the selected node). Relevant information about the shipment line can include the name of the freight carrier, number, type, and value of material and/or part and/or component and/or product currently being shipped, and the current status of the shipment. The boxes in FIG. 4 show relevant shipment information including a number and value of products, parts, and/or components currently en route along the corresponding shipment line.

With respect to FIG. 1, the supply and/or logistics chain management system 150, via communication links 154, monitors (and collects information regarding) first, second, third, fourth, . . . tier enterprises in the supply and/or logistics chain to determine supply and/or logistic chain performance information. Exemplary users of the system 150 include brand owners (e.g., retailers and wholesalers), and/or contract manufacturer and OEM representatives, such as a manufacturing representative, enterprise officers, and managers. Due to the adverse impact on the performance of the supply and/or logistics chain, the supply and/or logistics chain management system 150 can monitor for events potentially impacting adversely, or disrupting, supply and/or logistics chain performance.

"Supply and/or logistics chain performance information" typically includes any information relative to supply and/or logistics chain configuration and/or performance, including, without limitation, one or more of manufactured item output projections over a specified time period, production facility sizes and/or locations, raw material, work-in-process, and/or manufactured part, component, and/or product inventory levels, outstanding orders, order cycle times, days of supply in inventory, manufacturing resource type, availability, reliability, and/or productivity (e.g., human and automated resource levels and resulting output levels), unit operations (e.g., manufacturing steps, functions, or operations, unloading raw materials, packaging parts, components, and/or products, loading parts, components, and/or products, and the like), financial factors (e.g., labor rates and costs, energy rates and costs, raw materials costs, freight costs, tax rates, administrative and overhead costs, contractual and/or current spot market part, component, and/or product prices (from lower tier components), and the like), number of on time shipments, number of late shipments, order mismatch count, service quality (e.g., repair returns, repeat repair, no fault found, etc.), repair cost per unit (e.g., material cost per unit, average repair time, pieces consumed per unit, etc.), inventory value (e.g., spare parts stock, or SWAP stock, inventory turnover, days of supply of spare parts, days of supply of SWAP, days sales inventory spare parts, excess spare parts, excess SWAP stock, return to vendor rate, defective or OHB, and return to vendor or TAT, etc.), historic, current, and/or projected compliance with price, supply requirements, and/or other material terms, historic, current, and/or projected parts, components, and/or product output levels, mean, median and/or average, mode, historic, and/or projected freight transportation times, delays, or requirements, and the like. The performance information can be associated with a date, month, and/or season-of-year. KPI metrics can be generated from the performance information, such as on time shipment rate or percentage, late shipment rate or percentage, product rejection rate based on nonconformance with one or more restrictions, specifications, and/or requirements, parts, components, and/or product acceptance rate based on conformance with one or more restrictions, specifications, and/or requirements, and the like.

While the above example assumes that supply and/or logistics chain performance information is supplied to the nearest downstream partner, it is possible that one or more of the tier 2, 3, and 4 partners and/or logistic providers provide supply and/or logistics chain performance information directly to the supply and/or logistics chain management system 150. It is further to be understood that any number of entities, factories, plants, or other facilities may exist at each of the brand, integration, device, and raw material levels.

Inventory, whether a product or part or component of the product, can be tracked by the supply and/or logistics chain management system 150 manually or automatically or a combination thereof. A manual system, for example, is a system known as the card system or cardex. Other manual systems use a type of manual entry system to record inventory transactions and record the entries in a spreadsheet program rather than on a paper card. In automated systems, whenever a movement of inventory occurs, an inventory management system receives an automatic update of the transaction. Various tracking methods exist to track inventory. The barcode, also known as the universal product code (UPC), remains one of the most common inventory tracking methods. Barcodes can track the movement of inventory throughout the supply and/or logistics chain. The barcode contains data on the item's description, the item's price and the item's unit of measure. Radio frequency identification (RFID) is another method used to track inventory. RFID technology comes in two forms: active RFID and passive RFID. Active RFID works best in environments where security issues exist and ones that require real-time tracking information. Passive RFID works best when used with handheld scanners and where security issues do not exist. Electronic Product Codes may also be employed. Code or identifier sensors or readers are positioned throughout the supply and/or logistics chain, typically at entrance and exit points to a facility, such as a warehouse, to detect inventory movement and identify what inventory items have moved. The readers at each ingress or egress (or choke) point can be meshed auto-ID or hand-held ID applications. Tracking can also be capable of providing monitoring data without binding to fixed location by using a cooperative tracking capability, e.g. a real-time locating system or RTLS. In this way, the inventory tracking system can track the addition of items to an inventory and any disbursements from inventory.

The detected codes or identifiers can be fed into Work in Progress models (WIP) or Warehouse Management Systems (WMS) or ERP software. These models or modules can then provide the inventory information to the other supply and/or logistics chain members, such as the supply and/or logistics chain management system 150.

There are a number of examples of events impacting the performance of a selected supply and/or logistics chain. Events can include, for example, natural disasters (e.g., natural disaster event and wherein the natural disaster is one or more of an earthquake, tsunami, volcanic eruption, fire, flood, avalanche, and landslide), weather patterns (e.g., storm, typhoon, hurricane, cyclone, tornado, wind, flood, and blizzard), political disruptions (e.g., coup d'etat, revolutions, changes or upheavals, sabotage, terrorism, act of war, military action, police action, embargo, and blockade), criminal actions (e.g., piracy, hijacking, theft, arson, vandalism, and the like), acts of violence (e.g., terrorism, war, political upheaval, military action, and the like), freight disruptions (e.g., train derailment, maritime vessel sinking, airplane crash, freight embargo, freight vehicle wreck, naval blockades and the like), energy shortages, disruptions, or blackouts, business disruptions (e.g., device or system malfunction, labor disruption (e.g., strikes or threatened strikes)), lawsuit, financial insolvency, public announcement by a partner or competitor, scheduled event or holiday (e.g., religious, political, or other holidays), and bankruptcy), and/or a human and/or animal health event, such as a health emergency, sickness, death, species endangerment, and/or species extinction caused by one or more of a pathogen, disease, virus, nano-virus, biological weapon, bacteria, parasite, worm, fungus, prion, and/or any other animal health-related outbreak, epidemic, pandemic, etc.

Figure 2:
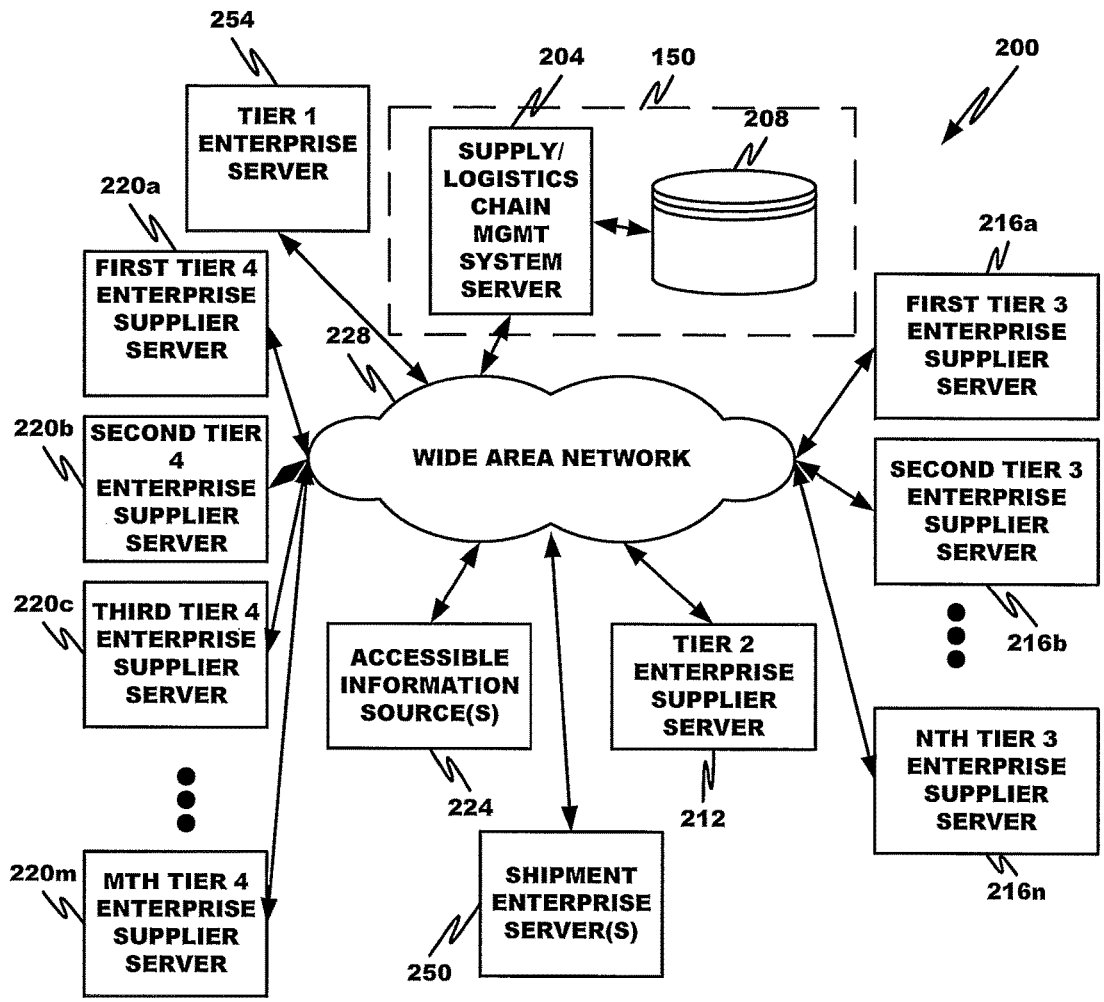
FIG. 2 depicts a communications networked architecture according to an embodiment.

FIG. 2 depicts a communications networked architecture 200 according to an embodiment.

The supply and/or logistics chain management system 150 comprises a server 204 and associated database management system (not shown) and database 208. As will be appreciated, the supply and/or logistics chain management system 150 can be maintained by any one of the tier 1, 2, 3, and/or 4 enterprises or an entity independent of the foregoing.

The supply and/or logistics chain management server 204 can be any computerized process that shares a resource with one or more client processes. It may run one or more services (typically as a host), to service the needs of other computers on the network. Typically, the supply and/or logistics chain management server 204 is a computer program running to serve the requests of other programs.

The database 208 can be any organized collection of data and their supporting data structures. The database can be based on any data model, including the relational model, entity-relationship model, object model, object relational model, XML, or other database model.

Referring again to FIG. 2, the tier 1 enterprise 100 can have a corresponding tier 1 enterprise supplier server 254 to provide supply and/or logistics chain performance and other information, directly or indirectly, to the supply and/or logistics chain management server 204.

The tier 2 enterprise supplier 104 can have a corresponding enterprise supplier server 212 to provide supply and/or logistics chain performance and other information, directly or indirectly, to the supply and/or logistics chain management server 204.

Each of the first, second, . . . nh tier 3 enterprise suppliers 108a-n can have a corresponding tier 3 enterprise supplier server 216a-n to provide supply and/or logistics chain management performance and other information, directly or indirectly, to the supply and/or logistics chain management server 204.

Each of the first, second, third, . . . mth tier 4 enterprise suppliers 112a-m can have a corresponding tier 4 enterprise supplier server 220a-m to provide supply and/or logistics chain management performance and other information, directly or indirectly, to the supply and/or logistics chain management server 204.

The shipment enterprise server(s) 250 represent(s) the freight enterprises handling air, land or water borne shipments between nodes (e.g., sites) of the supply and/or logistics chain. The freight enterprises can be any entity providing shipping or freight services. Exemplary freight enterprises include railway companies, short and long haul trucking companies, freight company servers (to provide freight tracking information, freight movement projections between two locations, and the like), shipping lines, maritime shipping companies, container shipping companies, ro-ro shipping companies, transoceanic shipping companies, logistics services or courier companies, air freight companies, and the like.

The shipments can be tracked by one or more techniques. The shipment enterprise server 250 can provide position and status updates, such as freight tracking information and freight movement projections between two locations, to the supply and/or logistics chain management system server 204. The shipments can be tracked using an active and/or passive satellite positioning system, such as the Global Positioning System, that includes, in the vehicle, a receiver of position-based signals received from a satellite. A typical shipment tracking system, such as a vehicle tracking system, combines the use of automatic vehicle location in individual vehicles with software that collects the fleet data for a comprehensive picture of vehicle locations. Modern vehicle tracking systems commonly use satellite position information (e.g., including information provided from a satellite positioning system ("SPS"), such as GPS, GPRS, GNSS, GLONASS, IRNASS, etc.) technology for locating the vehicle, but other types of automatic vehicle location technology can also be used. In another technique, terrestrial antenna information (such as triangulation) is used to locate a shipment, whether by air, water, rail or road. The shipment vehicle, whether ship, barge, train, truck or airplane, emits an RF signal at periodic intervals enabling position determination by triangulation based on times of receipt at spatially dislocated antennas. The vehicle can also periodically transmit a GPS location signal to a carrier providing current GPS position. The RTLS system can provide information on how fast the shipment is moving (based on changes in position as a function of time) and estimate when the shipment will arrive at its final or intermediate destination. Another possible source of shipment information is realtime satellite feeds, such as Google™ Earth.

The network accessible information source(s) 224 include any source of information relevant to supply and/or logistics chain performance, including, without limitation, social networks such as Twitter™ Firehose™, news sources and/or aggregators (to provide news on current events that may impact positively or negatively the supply and/or logistics chain performance), weather data sources (e.g., the National Weather Service, national and local news sources, the Weather Channel™, Weather Source™, worldweatheronline.com, and the like), governmental entities (such as courts, law enforcement authorities, geological surveys, disaster relief agencies, and the like to provide legal or regulatory changes or requirements, lawsuits, bankruptcy filings, and the like, and other information), and law enforcement or military authorities.

Such information sources can be monitored applying word cloud techniques to one or more information feeds, which graphically represent word usage frequency. Generally, the more frequent a word or group of words is used the greater the likelihood that the fact or event described by the words or group of words exists. The words or group of words can further be weighted for reliability by the source, with law enforcement and military authorities being given a higher or more reliable weighting than news sources. Other automated techniques can be employed. For example, a web crawler is an Internet bot can systematically browse the World Wide Web, typically for the purpose of Web indexing. Web crawlers can copy all the pages or other information they access for later processing by a search engine that indexes the downloaded pages so that users can search them much more quickly. Human agents can also monitor information sources for event related information.

The various servers and sources are connected by a circuit and/or packet switched wide area network ("WAN") that covers a broad area (e.g., any telecommunications network that links across metropolitan, regional, or national boundaries) using private and/or public network transports. An exemplary WAN is the Internet.

While the supply and/or logistics chain is described primarily with reference to manufacturing and distribution of a product, it can be applied equally to warranty and/or repair or maintenance services and logistics and procurement operations. The term "supply and/or logistics chain(s)" and variations thereof are intended to encompass these other types of operations.

Figure 3:
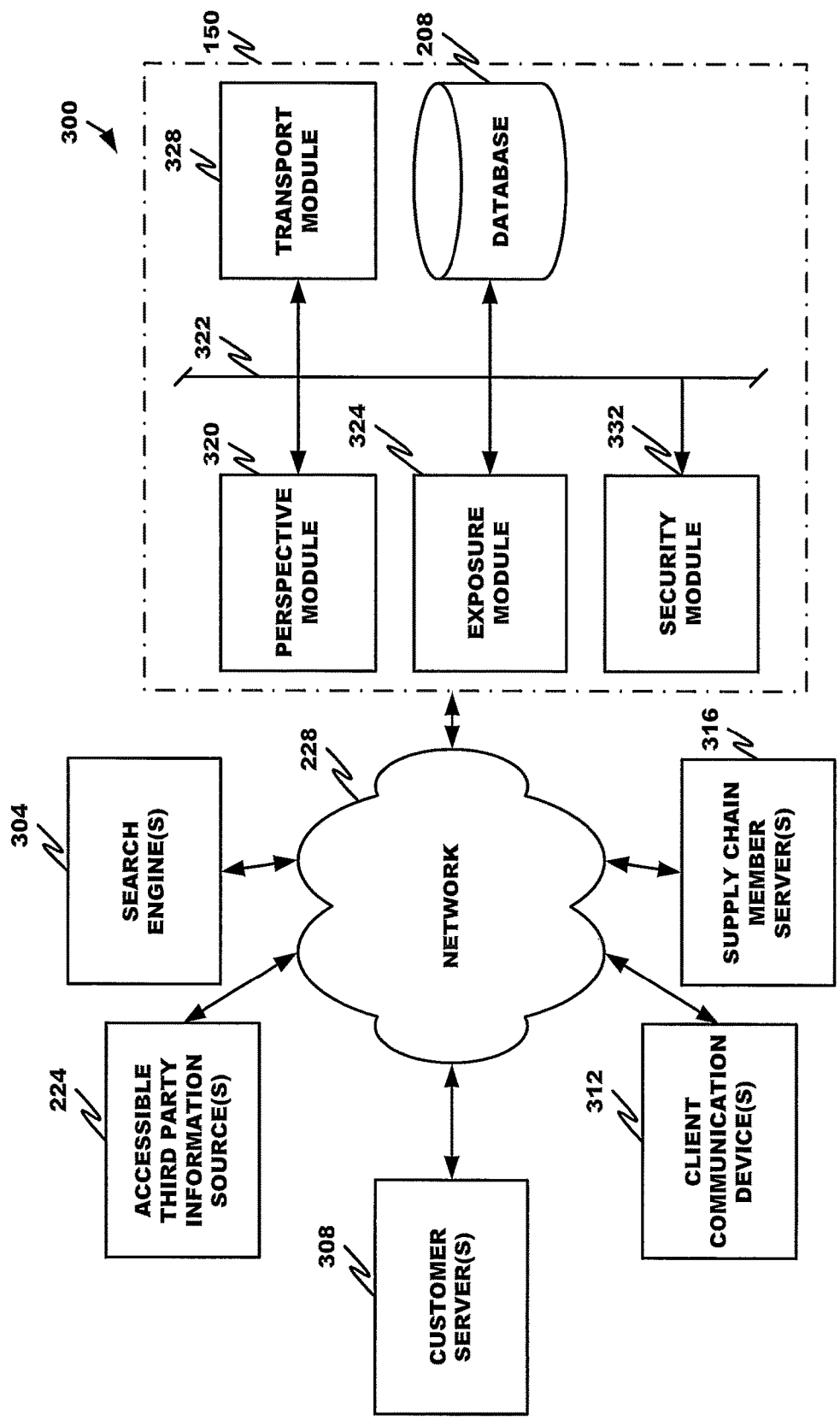
FIG. 3 depicts an example of a supply and/or logistics chain monitoring system.

FIG. 3 depicts an example of a supply and/or logistics chain monitoring system 300. The system 300 comprises the supply and/or logistics chain management system 150, search engine(s) 304, accessible third party information source(s) 224, customer server(s) 308 (which, for example, is a server maintained by a brand owner other than an OEM), client communication device(s) 312 (which include any portable or non-portable communication device such as tablet computer, laptop, personal computer, cellular phone, and the like), and supply chain member server(s) 316 (which include tier 1 enterprise server 254, tier 2 enterprise supplier server 212, first, second, . . . nth tier 3 enterprise supplier server 216a-n, and first, second, third, . . . mth tier 4 enterprise supplier server 220a-m), all interconnected by network 228. The supply and/or logistics chain monitoring system 300 can determine, based on past supply and/or logistic chain performance information, a performance rating for a selected object in the supply and/or logistics chain. The performance rating can be based on a scale from lowest performance level to highest performance level. The supply and/or logistics chain management system 150 includes a perspective module 320, an exposure module 324, a transport module 328, a security module 332, and the database 208 connected by a local area network or bus 322.

The Perspective Module 320

The perspective module 320 can monitor the health and operation of a selected supply and/or logistic chain using defined parameters. The user can select one or more KPIs of interest and the module 320 will monitor temporally changes in the values of the KPIs. Examples of KPI metrics include DIFOT (delivery in full and on time), on time shipping/delivery (e.g., on time customer shipment, on-time supplier delivery, on-time arrivals, etc.), LIFR (line item fill rate, perfect or error free measurement, customer order to commit cycle time, order cycle time of finished goods, on time supplier orders, days of supply: finished goods, work in process (e.g., parts or components), or raw materials, inventory: finished goods, work in process (e.g., parts or components), or raw materials (e.g., "RAW/WIP/FG" inventories), perfect order fulfillment, total supply cost, supply and/or logistics chain costs as percentage of sales, total supply and/or logistics chain cost per unit sold, warehousing cost, transport cost per unit, labor productivity rates, delivery performance, fill rate, supplier fill rate, order fulfillment lead times, supply and/or logistics chain response time, production flexibility, cycle time, defects per million opportunities or DPMO, shipping accuracy, % orders with products on back order, order compliance, supplier lead-time variability, units of a selected component, part or product produced today, days of supply of such units, component, part or product yields, phase in and/or out of a unit, last time buy of a type of unit, and the like. When a KPI metric rises above or falls below a selected threshold, a warning or other notification can be sent to the user. The perspective module 320 can obviate the needs to send the user spreadsheets or manually copy data between systems. The perspective module 320 can provide a common source of supply chain and/or logistics information across a selected multi-enterprise supply and/or logistics chain, e.g., from suppliers, to manufacturers, to distributors, and to carriers. When a selected KPI metric exceeds configured thresholds, for example, dashboard alerts can be provided to specified users.

Dashboard displays can provide users with real-time tracking of selected KPI metrics in a selected supply and/or logistics chain. The displays can be user configurable and include a number of different dashboard elements including: gauges (e.g., at-a-glance tracking of high level health indicators), trend lines (with optional thresholds) to view how a selected KPI metric or set of KPI metrics changes over time to get early warning into potential problems, scorecards (with optional breakdowns and thresholds) to track important numerical values or KPI metrics, such as dollars of global inventory, and pie and/or bar charts. The dashboard element can show the KPI metric on an absolute (e.g., numerical) or relative (e.g., percentage) basis.

The Exposure Module 324

The exposure module 324 can identify and respond to risks in a selected supply and/or logistics chain. It can show a user where and by whom each and every component of a selected product is manufactured, supplied, and distributed. The exposure module 324 enables event risk and operations management throughout the supply and/or logistics chain by constantly tracking selected news sources of global events, such as by social networks, news feeds, governmental statements, and the like. Each news source can have an assigned degree of reliability or reliability ranking for use in determining whether or not to notify designated recipients for a selected supply and/or logistics chain of an event potentially impacting the selected supply and/or logistics chain and, if so, provide designated recipients with an indication of the reliability of the event information. The exposure module 324 can receive a live news feed from selected news sources on what is happening in the world that might impact a selected supply and/or logistics chain. The news feed can bridge over to events.

The exposure module 324 can enable a user to identify and respond to event-related risks in a selected supply and/or logistics chain by knowing immediately what sites, parts, and products may be impacted. The exposure module 324 can enable the user to ping part and component suppliers directly to verify impact and kick-start disruption event mitigation. The exposure module 324 can monitor the selected supply and/or logistics chain with substantial real-time 24-hour, seven-day-a-week, and/or 365 days/year "24/7/365" global event feeds. When a disruption event occurs, the exposure module 324 can geo-locate the failure path against plural points in the selected supply and/or logistics chain and assess a likelihood of impact toward the delivery of products to customers, and, when the likelihood and/or severity of impact is sufficiently high, generate and send to a client communication device 312 an auto-notification containing event information. The exposure module 324 can determine, by applying risk analysis, whether the event is likely to impact the selected supply and/or logistics chain and provide a warning to the user. The exposure module 324 can provide a live view, which is a focused, real-time view of the disruptions and/or other events impacting manufacturers, suppliers, and/or distribution sites in a selected supply and/or logistics chain. When events occur, the exposure module 324 can display an event perimeter ring, or range of disruption, on the live view map with details showing supply and/or logistics chain failure paths and tier 1-4 enterprise interconnections. For example, as shown in FIG. 4 a disruption event, depicted as an earthquake, can be shown on the map display at a location 408 impacted by the event. The range of disruption 412 is assigned to the disruption event indicating a likely spatial range impacted by the event. As will be appreciated, different event types and events for a given event type can have differing assigned spatial ranges of disruption. For example, an earthquake may have a larger spatial range of disruption than a storm, and an 8.0 earthquake on the Richter scale would have a larger spatial range of disruption than a 5.5 earthquake on the Richter scale. A range can be modeled by many techniques, such as by using a shape file. The exposure module 324 can enable the user to drill down by site to view indirect impact of upstream failures or disruptions on products and customers. The exposure module 324 can enable a user to work through a part or component list for a selected product, starting with single-sourced parts or components for each event that occurs. As the user works through the list, he or she can mark the event severity as none, low, medium, or high, thereby enabling the list to focus on resolving high impact products first. The exposure module 324 can notify not only the user of an event but also the tier 1 enterprise or tier 2-4 enterprise suppliers (e.g., manufacturers and/or suppliers and/or sites) in the event impact zone. In this manner, each tier 1-4 enterprise or impacted site can proactively indicate whether they are impacted (and, if impacted, a degree of impact severity) or in the clear, thereby enabling the user to focus more quickly and effectively on mitigation.

The Transport Module 328

The transport module 328 can enable a user to manage and substantially optimize a global transportation network. It can show a user real-time information for each and every route and shipment in a selected supply and/or logistics chain, even down to individual route segments, thereby enabling the user to anticipate delays and fix them before they impact customers. The module 328 can provide monthly performance reports that compare costs, service level agreements ("SLAs"), and actual shipping times. The module 328 can provide not only shipment visibility and estimated shipment arrival times but also early warning of delays. It can enable a user take an appropriate action for a late shipment, such as drilling down to identify the root cause and collaborating with the shipper, manufacturer, distributor, assembler, or other supply and/or logistics chain member to resolve the issue or mitigate the impact of the late shipment on the selected supply and/or logistics chain. It can provide the user with a supply and/or logistics chain view showing all of the sites in a selected supply and/or logistics chain and the routes that connect them. The user can easily filter routes by source or destination site. It can enable a user to select a route by allowing the user to view all the ports, depots, or airports and intermediate transfer points along the route and to review and compare alternate routes. In one shipment tracking example, a tracking view provides real-time visibility into the shipments flowing through a selected global supply and/or logistics chain. Every shipment, including those still being processed at a site, is visible on an interactive global map. The user can select (e.g., by clicking, gesture, or other input) on a site to reveal relevant location and shipment details or select a shipment to reveal details on contents, status, and estimated delivery. The transport module 328 can access historical transit times for intermediate segments and warn a user when a shipment will arrive late—even if the shipment is still en route. It can help the user to optimize a selected supply and/or logistics chain transportation network by providing historical analysis of carrier performance. It can use monthly reports that compare costs and actual shipping times to contracted SLAs to manage carriers more effectively.

The transport module 328 can use one or more independent sources, in addition to the freight carrier or shipping company, to determine status and/or location of a selected shipment. One independent source is an RTLS system using a combination of satellite position information (such as a satellite positioning system ("SPS"), e.g., GPS and GLONASS) and terrestrial antenna information (such as triangulation) to locate a shipment, whether by air, water, rail or road. The dual use of an SPS and terrestrial antenna information is synergistic. For example, in densely populated, forested, or mountainous areas an SPS can lose accuracy due to signal interference or loss.

The transport module 328 can provide scheduling information, including projected shipment arrival dates for parts, components, and/or products from a first, second, third, or fourth tier enterprise 100, 104, 108, and 112 and required shipment departure dates for parts, components, and/or products. Each of the shipment arrival and departure dates can be linked to a set of data structures describing the shipment, including shipment source and destination, freight carrier, freight tracking information, current shipment status and/or location, shipment contents (by product type and number), date of shipment, and the like). The projected shipment arrival dates can be received from the transport module 328. The shipment departure dates can be determined from the enterprise sourcing the part, component, and/or product.

The supply and/or logistics chain monitoring system 300 can track past performance for a selected object (e.g., a tier 1-4 enterprise and/or enterprise site and/or freight carrier and/or shipping route), such as by comparing the actual part, component, and/or product shipment arrival or departure date against a selected date (received from the carrier, required by contract or order or SLA, and/or projected by the supply and/or logistics chain monitoring system 300), to evaluate performance of the object, identify seasonal trends, and the like. The past performance for an object (e.g., whether tier 1-4 enterprise, tier 1-4 enterprise site, freight carrier, hub, intermediate transfer point, or shipping route) can be used to determine and assign a level of confidence in part, component, and/or product deliveries being received by the selected date. The level of confidence, when low, may provide a basis to order additional part, component, and/or product from a more reliable source. The level of confidence can also be based on past performance of each tier 1-4 enterprise or each different facility of a common tier enterprise.

The estimated or projected delivery date for an order can include an associated probability or likelihood and, optionally, an associated range of arrival dates that the parts, components, and/or products in the order will be timely received by the selected arrival date or within the range of arrival dates. The range of arrival dates can be selected using a standard deviation of arrival times based on current and/or historic performance information and/or other relevant information. For example, a historic reliability or probability of timely receipt at a destination facility from the selected lower tier enterprise supplier site, and optionally associated standard deviation of historic receipt dates for the parts, components, and/or products relative to a target date, can be used to provide the probability and optionally standard deviation of the destination facility receiving a current shipment from the selected lower tier enterprise supplier site.

The Security Module 332

Security over the wide area network 228 is managed by the security module 332 to protect transmitted information. As set forth in copending U.S. application Ser. No. 13/935,209, which is incorporated herein by this reference, the security module 228 routes every data query through a single "Platform Query" entry point that enforces appropriate security constraints. Access to objects and records can be controlled at the user, role, organization, and enterprise level. A user can specify access based on the relationship among multiple enterprises. For example, if companies A and B are two OEMs that outsource manufacturing to a selected company C and if company A wants to share order information with a selected carrier company, company A can share the information even if company B has a different agreement with company C that does not allow the selected carrier company to see company B's orders. The security module 332 can enable the collected information to be maintained in one data location (and common database) without the use of a partitioned database. This can enable the use of a simpler data model that enables ease of constructing relationships between enterprises, provides stability, and provides scalability. Each data row of the model can have a different schema. The data model can also enable sharing of information across and among different supply and/or logistics chains.

The security module 332 can further provide cloud security, such as secure client connectivity with extended validation ("EV") certificates, OpenID challenge/response client authentication, user-specific authorization tokens, database/application separation, support for secured socket layer ("SSL") encryption of API calls, separation of credential storage with no credential access from interface zones, and mechanisms to prevent data spoofing and query injection.

The Database 208 and Database Management System

The database contains supply and/or logistics chain performance information collected from tier 1, 2, 3, and/or 4 enterprises and freight companies in the supply and/or logistics chain and from accessible information source(s) 224. A database management function can store, update and otherwise manage the data in the database 208 in accordance with a selected data model. The data structures are typically associated with one or more enterprises (e.g., material supplier, part/component manufacturer, product assembler, freight or shipping company, distributor, brand owner, wholesaler, and/or retailer) in the supply and/or logistics chain. Transactional documents, such as purchase orders, material safety data sheets, and bills of material, and agreements, such as supply and/or manufacturing agreements, or RMAs, and SLA's, contain references to all owners down the organization level, have corresponding role types and functions specified (e.g., only a buyerRole can change requestQuantity field), and include preferences and settings referenced to an appropriate level (e.g., enterprise (or the part of the enterprise involved in the supply and/or logistics chain transaction), user, etc.).

The database 208 can include, for each selected enterprise in the supply and/or logistics chain (e.g., each tier 1, 2, 3 or 4 enterprise), name, geographical location of corresponding sites, geopolitical location of corresponding sites, material, part, component, and/or product type and/or identity supplied by the enterprise and by each corresponding site, current spot market and/or contractual sales price of the material, part, component, and/or product type supplied by the enterprise, respective supply and/or logistics chain performance metrics of the enterprise and/or each site of the enterprise, material, part, component, and/or product supply and/or purchase commitment with another enterprise in the supply and/or logistics chain, specifications and requirements for material(s), part(s), component(s), and/or product(s) supplied and/or purchased by the enterprise, bills of materials for materials, parts, components, and/or products, material, part, component, and/or product quantity and shipment dates and expected arrival dates at the next enterprise in the supply and/or logistics chain, order cycle and/or turnaround times, shipment and/or order volume, total number of shipments, number of on time shipments, number of late shipments, order mismatch count, repair details, and an association of the selected enterprise with one or more other enterprise(s) in the supply and/or logistics chain, such as by a contractual or other supply relationship.

Relevant data types for the event can include not only the event category, type, subtype, and severity but also objects impacted by the event, such as number of materials and/or parts and/or components and/or products impacted, number of downstream parts and/or components and/or products impacted (such as the parts and/or products supplied to the tier 1 enterprise 104), potential financial impact on all or part of the supply and/or logistics chain, and a number of supply and/or logistics chain sites affected.

While any data model and database management system can be employed, the database 208 management system typically uses a NoSQL database. As will be appreciated, a NoSQL database provides a mechanism for storage and retrieval of data that is modeled in means other than the tabular relations used in relational databases.

The Microprocessor Executable Components of the Exposure Module 324

Figure 5:
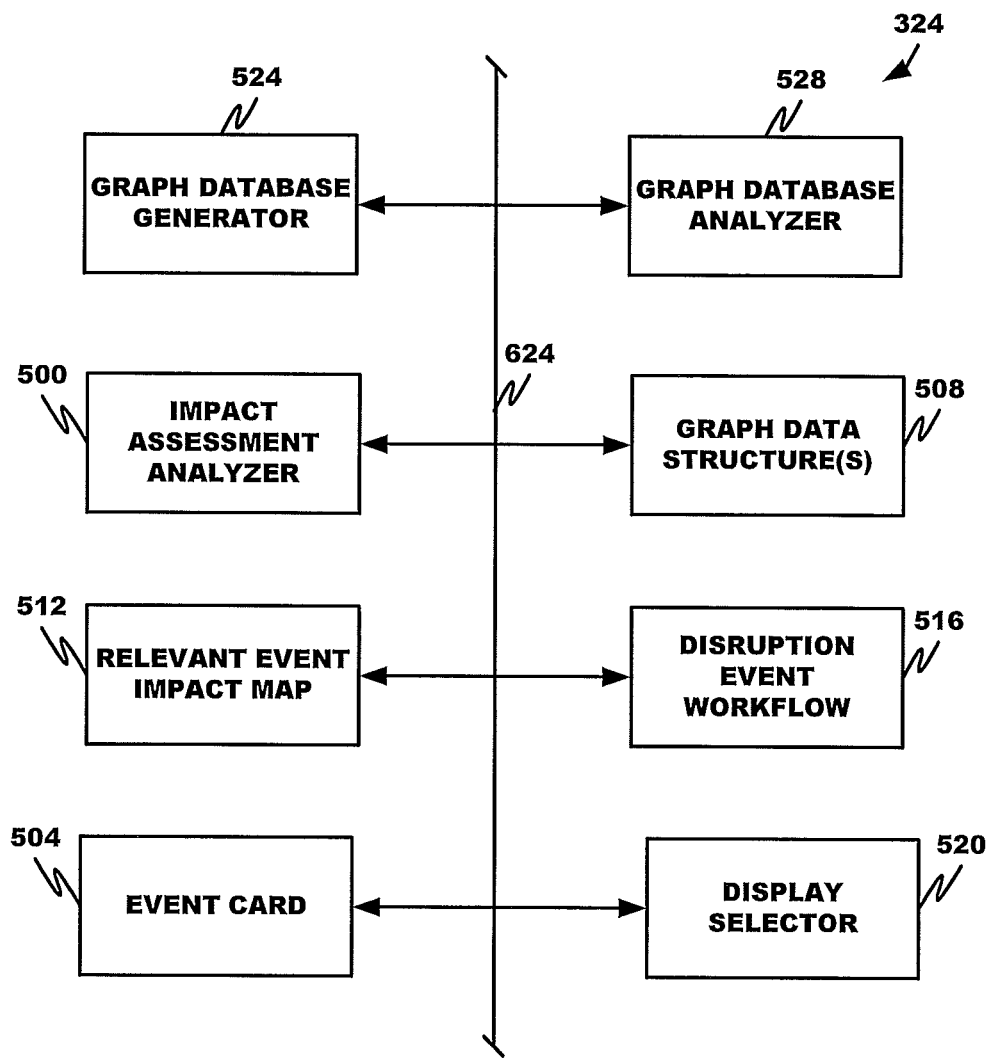
FIG. 5 is a block diagram of an exemplary exposure module.

With reference to FIG. 5, the exposure module 324 includes an impact assessment analyzer 500 that, for an event, determines a degree of impact of the event on a selected supply and/or logistics chain. The analyzer 500 creates, for the event, an event card 504, which is a set of data structures containing the event related information associated with event. The impact assessment analyzer 500, based on a traversal of a set of graph data structures 508 defining the selected supply and/or logistics chain by a graph database analyzer 528, evaluates the impact of the event on the selected supply and/or logistics chain and determines a concomitant risk associated with the event and outputs a relative event impact map 512 visually depicting the impact and risk, thereby enabling a user to determine whether the workflow associated with the event should be escalated. The set of graph data structures 508 can be generated manually or by a graph database generator 524. When the event is escalated to a disruption, the exposure module 324 instantiates a disruption work flow 516 to mitigate the impact of the event on the supply and/or logistics chain. A display selector 520 controls the display configuration and selects the information displayed to the user.

The Event Relative Impact Map 512

The relative event impact map or "RIM" 512 shows the supply and/or logistics chain risk analysis of an event or issue's impact severity on a selected object relative to a set of objects (e.g., part, site, purchase order, transport lane, etc.). As discussed below in connection with various displayed views, these objects are represented as tasks to be completed to resolve the issue. The RIM 512 evaluates, substantially in real time, existing issues and, as tasks are resolved, recalculates by the impact assessment analyzer 500, the relative importance of each remaining object (e.g., if an event is impacting 15 sites but 5 have been mitigated, the RIM 512 will be recalculated to evaluate the relative impact of the remaining 10 sites). The RIM 512 can be accessed through the event/issue card detail pages, including those discussed herein. As shown and discussed below, the map feature can enable a user to quickly diagnose and prioritize the sites most impacted by an event and to take steps to respond to a supply and/or logistics chain disruption event and/or mitigate the effects of the disruption event on the supply and/or logistics chain, thereby conserving computational resources and bandwidth and enabling less capable communication devices, such as tablet computers and cellular phones, to provide the RIM 512 to the user.

Figure 6:
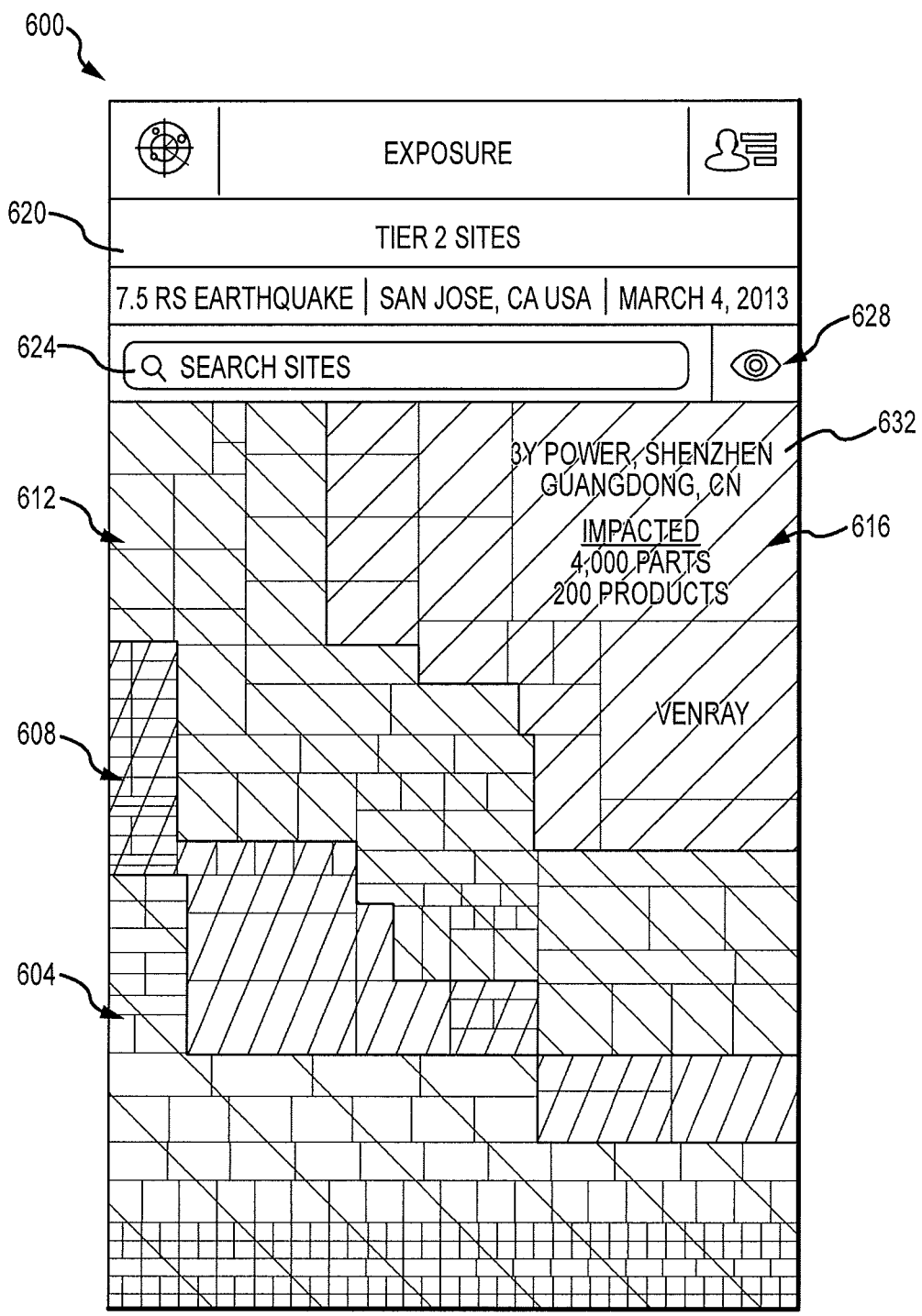
FIG. 6 is a screen shot of a relative event impact map according to an embodiment.

With reference to FIG. 6, an exemplary relative event impact map 600 displayed, by a client communication device 312, for an event, as outputted by the impact assessment analyzer 500, is depicted. The relevant event impact map 600 can use different colored shading and/or different cross thatching and/or different boundary markers and/or dimensions (e.g., size) and/or position and/or other visual indicator for each site tile or tile (each of which corresponds to a different site) to indicate which sites (such as site tiles 604 in green and smaller size and in lower left corner) are currently on time and/or out of the event disruption zone or area and operating correctly, which sites (such as site tiles 608 in yellow and more largely sized and centrally located) are partially impacted by the event, and which sites (such as site tiles 612 in orange or pink (less severe) or site tiles 616 in red (most severe) and even more largely sized and in upper right corner) are impacted by the event. The size and/or color and/or position and/or appearance of the site tiles 604, 608, 612, and 616 therefore indicate visually to the user the relative severity of impact (and risk) of a selected event on the corresponding site and/or therefore on the selected supply and/or logistics chain. Generally, higher risk values will be larger tiles, have red coloring, and be positioned the map's upper right corner. The data representing each variable is configurable by enterprise and organization. The rectangular RIM 600 can fit as many tiles as needed to represent the issue's impact—the tiles get smaller as needed to fit the required number of objects.

As shown in the views discussed below, each map tile can refer not to sites but to other objects, including a customer, raw material, customer part, component, product, enterprise and/or enterprise business unit, or shipment depending on how the algorithm is configured. There are thus different ways to sort or filter supply and/or logistics chain information, such as by date, customer, event impact severity, raw materials, parts, or components (impacted or provided), products impacted, shipments impacted, customer (or brand owner) and the like. In other words, where a product is at risk from an event, a user can sort or filter by parts, components, active shipments, or sites involved in manufacture of the product, where a site is at risk from an event, a user can sort or filter by parts, components, active shipments, or products potentially impacted by the site risk, where a part or component is at risk from an event, a user can sort or filter by active shipments, sites, or products involving the part or component, and so on.

Regardless of the object used, the color, position, size, and appearance of each tile can indicate a degree of impact of the event on a selected object (e.g., the operation of a selected site) and/or a number of objects potentially impacted (e.g., a number of sites potentially impacted, a number of components, parts, or products potentially impacted, and/or a number of shipments potentially impacted).

The information displayed on the tiles or tiles depends on the data being analyzed and is configurable by the enterprise organization user. By way of example, summary information can include: (1) for site RIM: site name, impacted parts, and/or products; (2) for parts RIM: manufacturer part number, supplier name, and/or number of products impacted; (3) for products RIM: product name, supplier sites at risk, and/or percentage of parts at risk; (4) for business unit RIM: issue, products at risk, and/or parts impacted; and (5) for kill shot analysis RIM: site name, site interconnectivity risk, and/or static risk index. Other criteria may be employed in assessing risk depending on the requirements of the user.

The relative event impact map 600 can include other information. The descriptive strip 620 includes summary information from the screen or display that the user comes from (i.e., tier 2 sites). If the information text is too long, the user can slide the strip 620 to left and right to view the entire text. The search field 624 receives a search string from the user to enable the user to search for items (i.e., sites) that he or she wants to view. The watch list button 628 (which has the appearance of an eye), if selected by the user, can reveal any watch list items that are in the map 600. If there are no watch list items in the map 600, a message is displayed saying, for example: "There are no sites/parts/customers from your watch list." As will be appreciated, a watch list is a list of objects of special interest to the user and can be the basis for generating warnings or other messages even if the event impact on the object is not significant. In other words, watch list items have different and typically lower thresholds than non-watch list items. An exemplary tile 632 is associated with a corresponding object, depicted in FIG. 6 as a site. The object associated with the tile 632 depends on which relative impact map the user is drilled into (e.g., tier 2 sites, parts, components, products, etc.). For each object type, the tiles 632 display different information as set forth below.

The relative event impact map 600 can be manipulated by gestures of the user on a touch screen of the client communication device; that is, the user can move his or her fingers apart to expand and zoom the map in on a selected map object tile or pinch his or fingers together to shrink the map. As the relative event impact map 600 is expanded, more event-related information is provided to the user (or becomes visible to the user).

In other configurations, the map 600 includes one or more selectable tabs to show a list of objects (e.g., components, parts, and/or products) impacted by a selected event and to access actions, including event escalation and dismissal. By clicking on a tile, a user can access additional information on the object within the relative event impact map 600. If the user clicks on an impacted site, the user will see the emergency contact information for that specific site, a comment area, and an update button. The update button can allow users to add additional tags representing any new information or status. When a site is resolved, the relative impact map 600 is updated by removing the resolved tile from the map and recalculating the importance of the remaining tiles. The impact of a supply-side mitigation will only flow downstream—if a part is mitigated, every downstream site, customer, product would reflect that part being mitigated and reduce any risk related to that part. If an enterprise site, such as that of a supplier or customer, is mitigated, nothing upstream would be impacted.

The display selector 520 renders the RIM 600 by following certain rules. As the tiles get smaller, the display selector 520 removes the text unless the user zooms in to a tile size to the point that a font size big enough to read by the user can be used. If a user tries to click on a tile that is too small for any text to show up, an animation of fingers moving apart is displayed to indicate that the user should pinch to zoom in. To limit the bandwidth needed to load the map, information on the tiles large enough to have text is pulled from the server.

Figure 7:
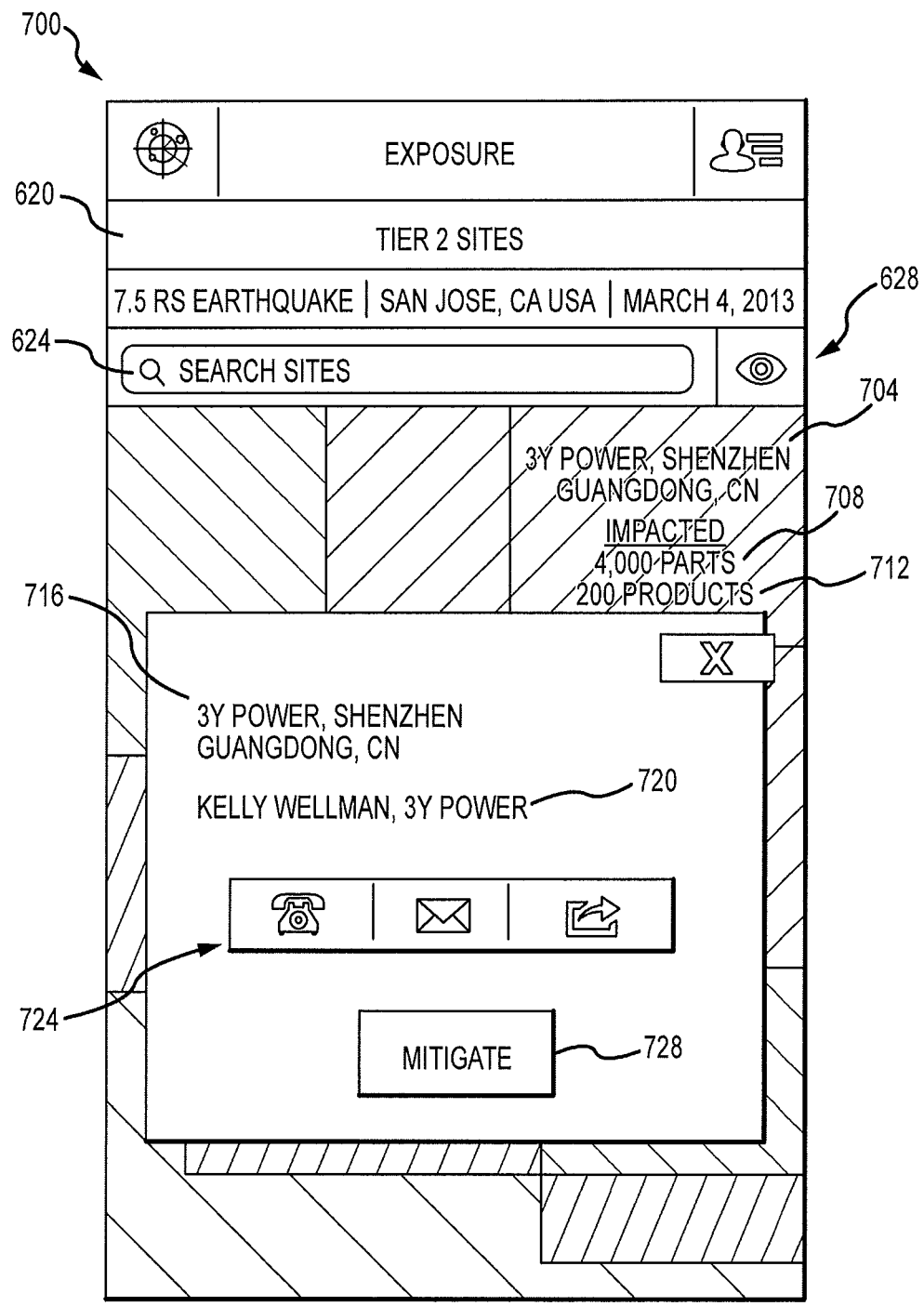
FIG. 7 is a screen shot according to an embodiment.

With reference to FIG. 7, an exemplary detailed view 700 of an object (e.g., site) selected from the relative event impact map 600 by the user selecting a tile 632 for more detailed review and displayed by a client communication device 312 is depicted. The view 700 is generated in connection with a 7.5 Richter scale earthquake impacting an enterprise supplier site of 3Y Power Shenzhen in Guangdong, China. By selecting the tile 632, the display 700 includes a site name 704 (which includes the site geographic location), number of parts impacted 708 as a result of the event impact on the corresponding site, and a number of products impacted 712 as a result of the event impact on the corresponding site, details 716 for the site, contact details 720 for a designated person responsible for receiving contacts about the site (including contact name, enterprise name, job title, and the like), contact modalities 724 (shown as phone (which if selected initiates a phone call to the designated person), email (which if selected opens up an email form for completion and sending to the designated person), and share (which, if selected, shares the contact information via a default email application). These communication modalities enable a user quickly and more conveniently contact other team members or site representatives to mitigate the impact of an event. The mitigate button 728, if selected, initiates a disruption event workflow 516 for the corresponding event.

Figure 8:
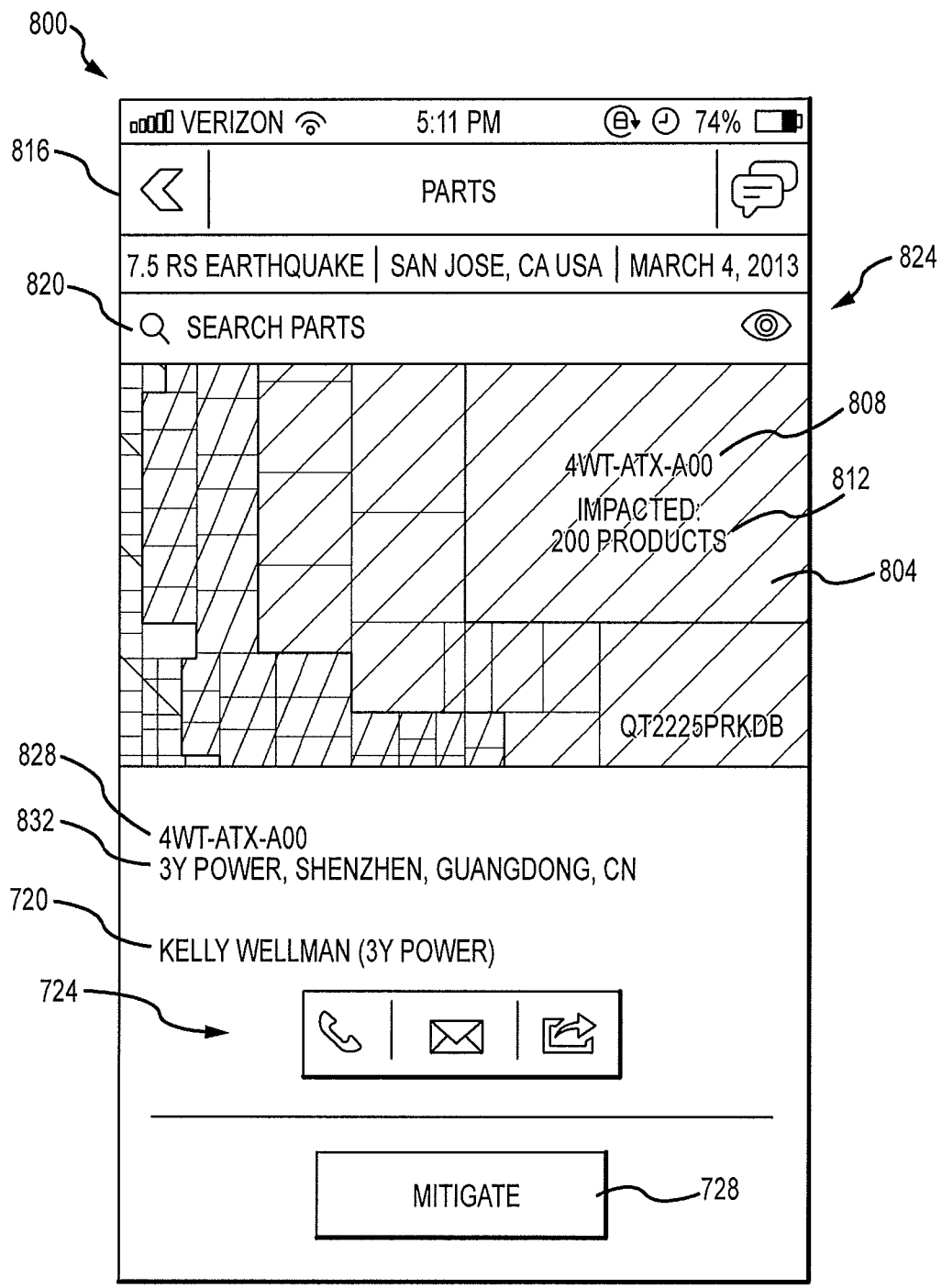
FIG. 8 is a screen shot according to an embodiment.

With reference to FIG. 8, an exemplary detailed view 800 of an object (e.g., parts) selected from the relative event impact map 600 or display 700 by the user selecting a part for more detailed review and displayed by a client communication device 312 is depicted. Each map tile 804 refers not to sites but a customer part or component. The tile 804 includes part name 808 (i.e., 4WT-ATX-A00) and number of products 812 impacted by the supply disruption of the named part caused by the event. The descriptive strip 816 includes summary information from the screen or display that the user comes from (i.e., parts). The search field 820 receives a search string from the user to enable the user to search for parts that he or she wants to view. The watch list button 824 (which has the appearance of an eye), if selected by the user, can reveal any watch list items (or parts) that are in the displayed map 800. By selecting the tile 804, the display 800 includes a part name 828, the name and geographic location 832 of the site supplying the identified part, contact details 720 for a designated person responsible for receiving contacts about the site, and contact modalities 724 for that person.

Figure 9:
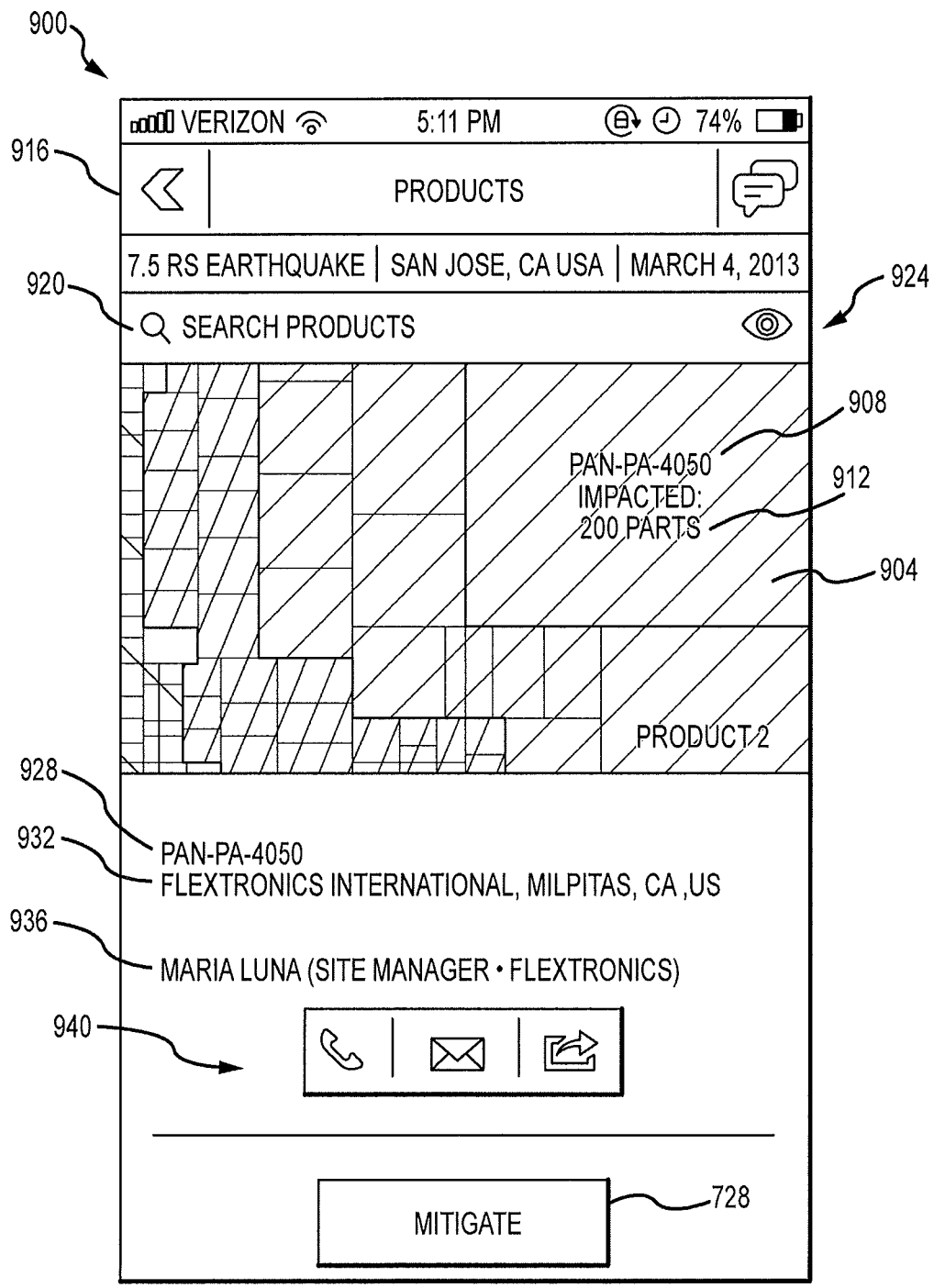
FIG. 9 is a screen shot according to an embodiment.

With reference to FIG. 9, an exemplary detailed view 900 of an object (e.g., products) selected from the relative event impact map 600, display 700, or display 800 by the user selecting a product for more detailed review and displayed by a client communication device 312 is depicted. Each map tile 904 refers not to sites but a customer product. The tile 904 includes product name 908 (i.e., PAN-PA-4050) and number of parts 912 impacted by the supply disruption of the named product caused by the event. The descriptive strip 916 includes summary information from the screen or display that the user comes from (i.e., parts). The search field 920 receives a search string from the user to enable the user to search for products that he or she wants to view. The watch list button 924 (which has the appearance of an eye), if selected by the user, can reveal any watch list items (or products) that are in the map 900. By selecting the tile 904, the display 900 includes a product name 928, the name and geographic location 932 of the site supplying the identified product, contact details 936 for a designated person responsible for receiving contacts about the site, and contact modalities 940 for that person.

Figure 10:
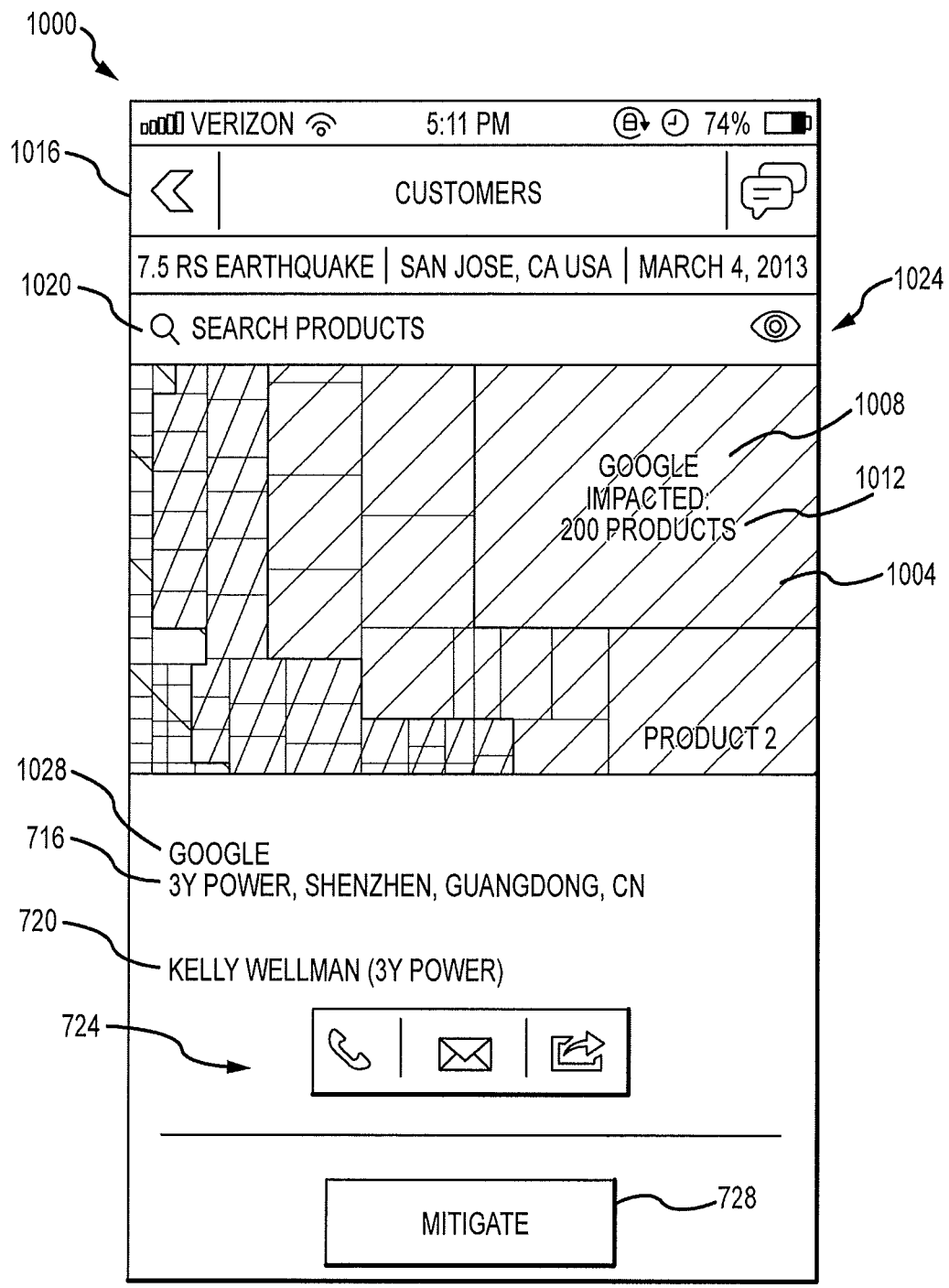
FIG. 10 is a screen shot according to an embodiment.

With reference to FIG. 10, an exemplary detailed view 1000 of an object (e.g., products) selected from the relative event impact map 600, display 700, display 800, or display 900 by the user selecting a customer for more detailed review and displayed by a client communication device 312 is depicted. Each map tile 1004 refers not to sites but a customer. The tile 1004 includes customer name 1008 (i.e., Google™) and number of products 1012 impacted by the supply disruption of the named customer caused by the event. The descriptive strip 1016 includes summary information from the screen or display that the user comes from (i.e., parts). The search field 1020 receives a search string from the user to enable the user to search for products for that customer that he or she wants to view. The watch list button 1024 (which has the appearance of an eye), if selected by the user, can reveal any watch list items (or customers) that are in the map 1000. By selecting the tile 1004, the display 1000 includes a supper name 716 and the name and geographic location supplier's the site affected by the disruption that is impacting directly the identified customer, contact details 720 for a designated person responsible for receiving contacts about the site, and contact modalities 724 for that person.

Figure 11A:
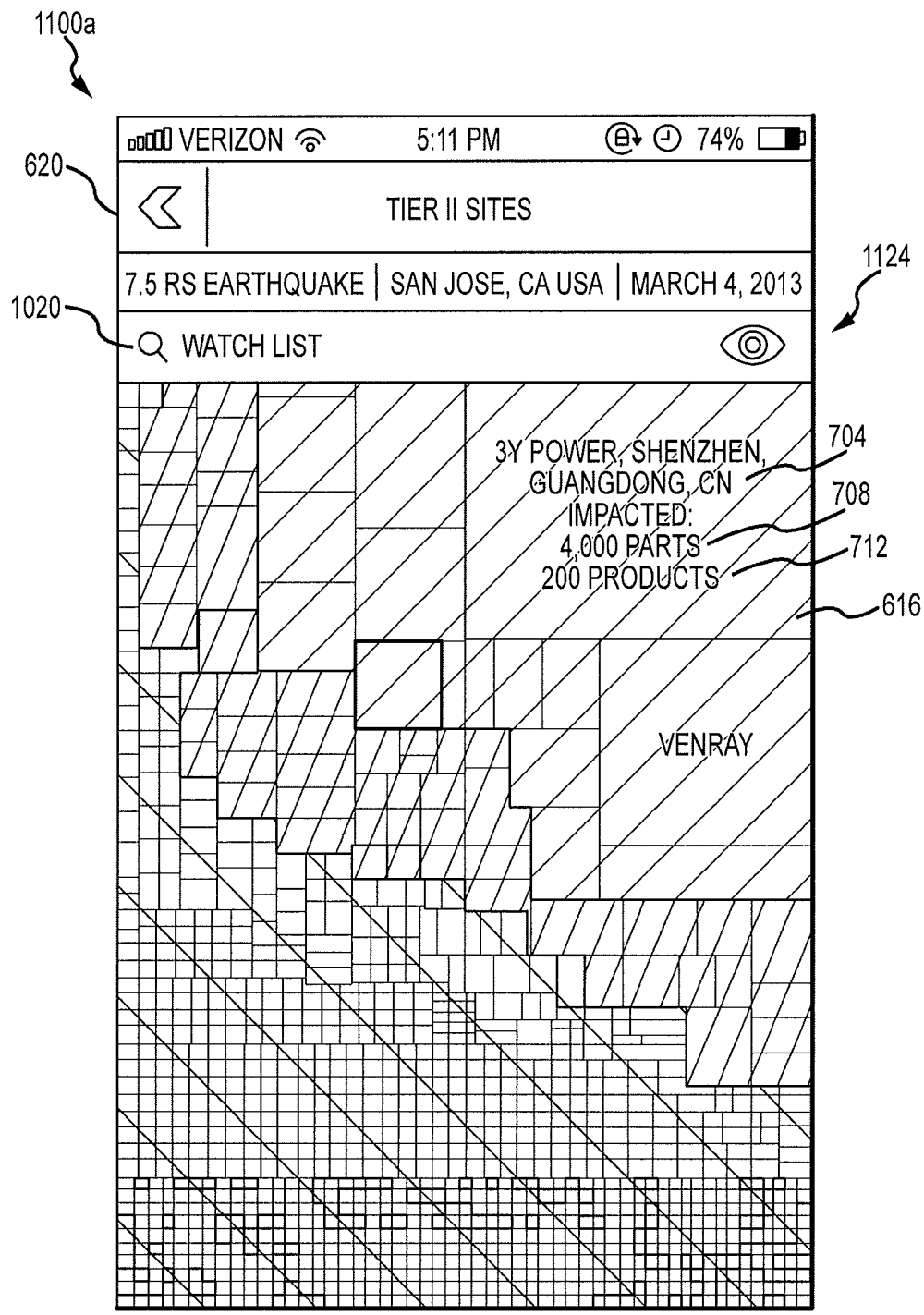
FIGS. 11A-B are screen shots according to an embodiment.
Figure 11B:
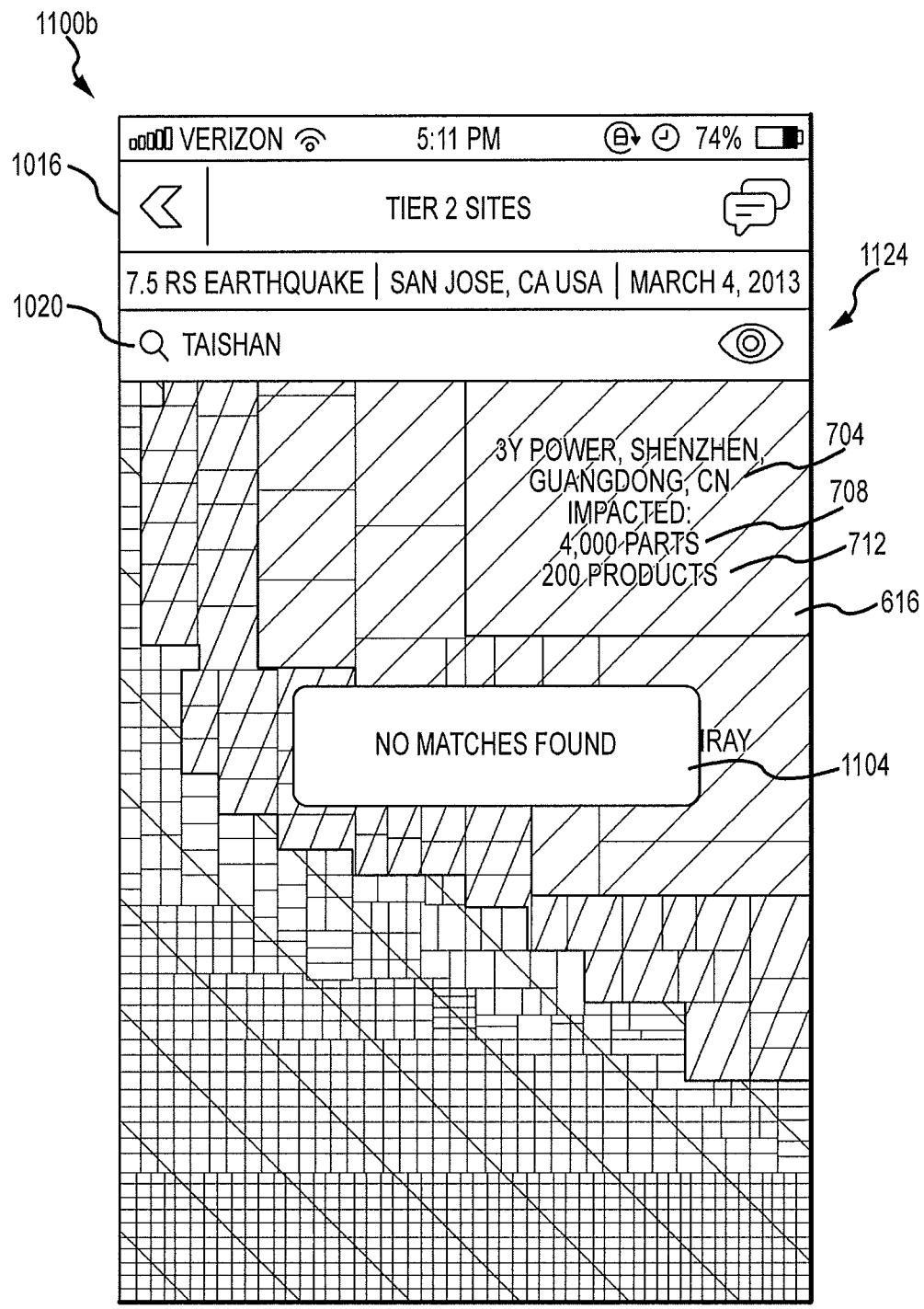

With reference to FIGS. 11A and B, exemplary detailed views 1100a, b displayed on a client communication device 312 of an object (e.g., sites) selected from the relative event impact map 600 or display 700 by the user tapping on the watch list button 1124 or entering a search term (e.g., "watch list") in the search field 1120. If there are not matches, a message 1104 will appear saying "No Matches Found".

Figure 12:
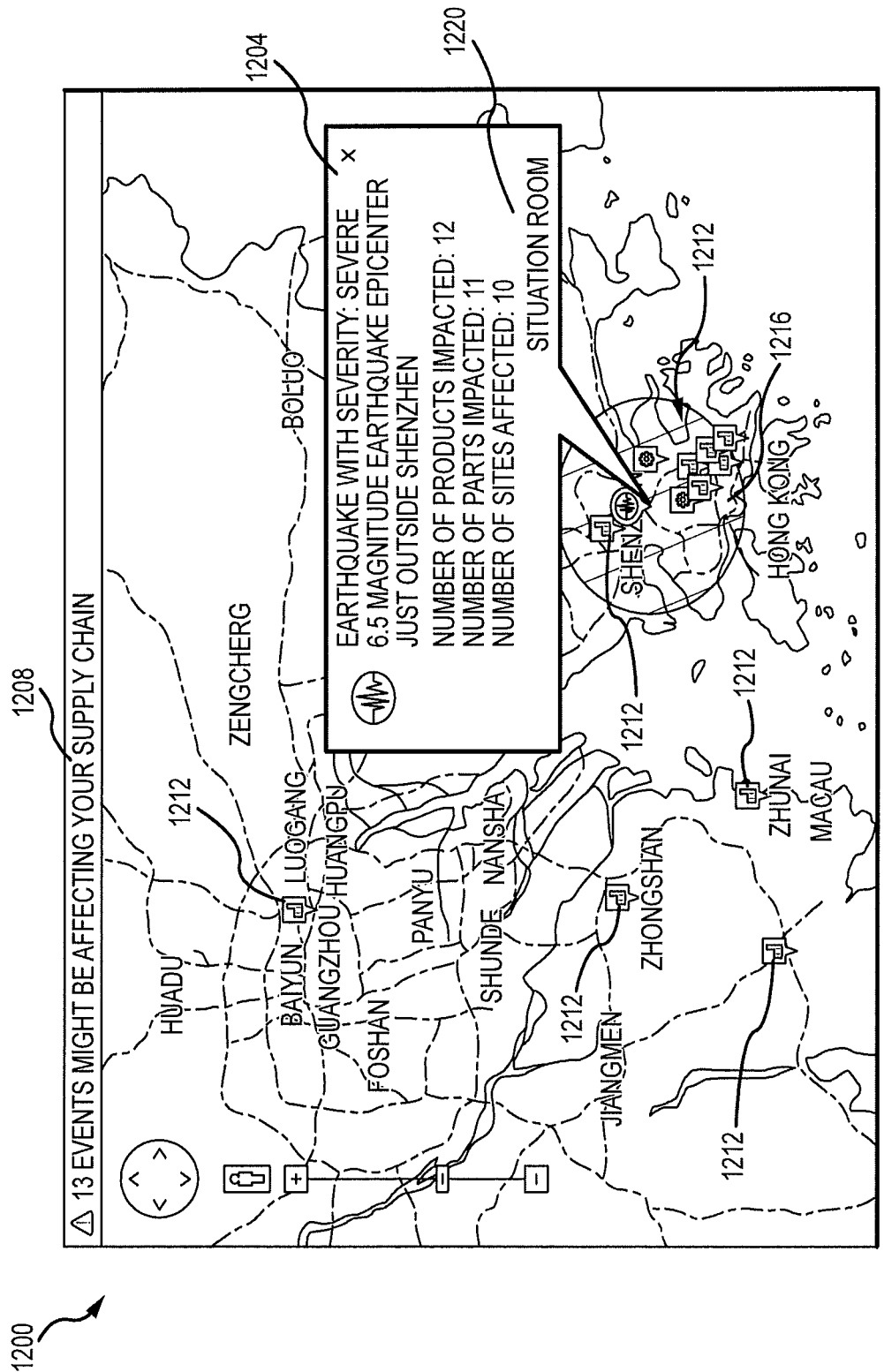
FIG. 12 is a screen shot according to an embodiment.

FIG. 12 depicts a further exemplary detailed view 1200 displayed on a client communication device 312 showing a detailed geographic view of various sites in the selected supply and/or logistics chain. By hovering over a site within an impact zone 1216 of the event, a message 1204 appears describing the event (e.g., "earthquake with severity" and "6.5 Magnitude earthquake epicenter just outside Shenzhen"), impact of event (e.g., "severe"), number of products impacted by the event (e.g., "12"), number of parts impacted by the event (e.g., "11"), and number of sites affected by the event (e.g., "10"). A "situation room" icon 1220, if selected, directs the user to the display 1300 of FIG. 13. A further header message 1208 at the top of the display provides a number of events (e.g., "13") that may be affecting the selected supply and/or logistics chain. Site tiles 1212 are geographically positioned on the display 1200.

Figure 13:
FIG. 13 is a screen shot according to an embodiment.

FIG. 13 depicts a further exemplary detailed view 1300 displayed on a client communication device 312 showing situation room information associated with a selected event. The view 1300 includes at least the following information: event description 1304 (e.g., "Weather: Severe Weather with severity: Moderate) and other event information 1306 (i.e., event date (e.g., "August 20, 2013") and event time (e.g., "6:16 pm PDT")), selected site affected 1308 (e.g., "Flextronics International™") and associated site information 1312 (e.g., selected site geographic location (e.g., "Doumen, Zhuhai, China")), parts affected 1316, select impact field 1320 (e.g., "None", "Low", "Medium", and "High"), total parts selected 1324 (e.g., "1"), and listing of parts, each part listing including part number 1328, part description 1332, impact 1336 (e.g., "Not Specified", "None", "Low", "Medium", and "High"), from enterprise site 1340, and to enterprise supplier site 1344.

Figure 14:
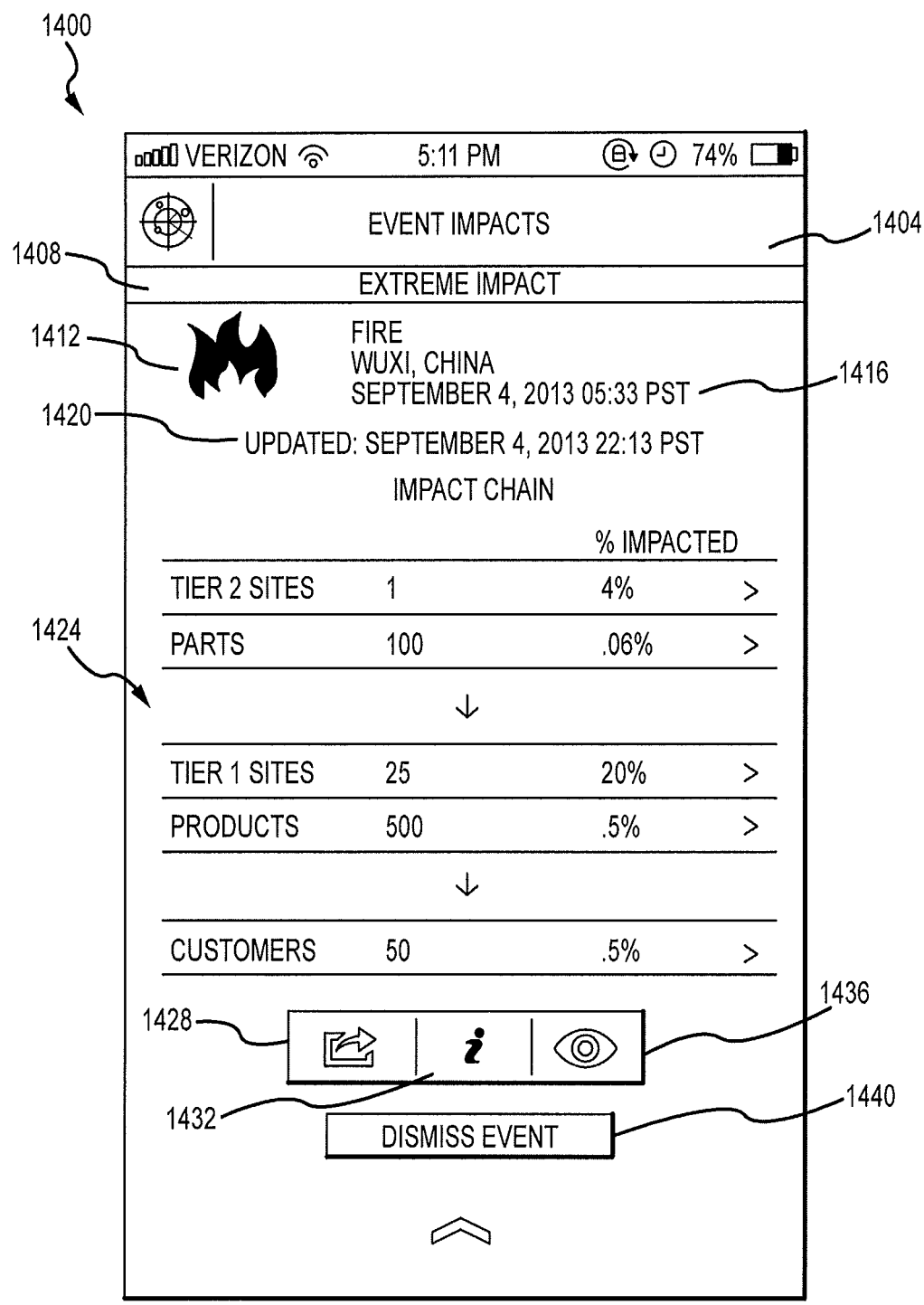
FIG. 14 is a screen shot according to an embodiment.

With reference to FIG. 14, an exemplary event notification 1400 displayed, by a client communication device 312, for a selected event is depicted. The notification effectively presents visually the event card for a selected event. The notification 1400 includes a descriptive strip 1404 that includes summary information from the screen or display that the user comes from (i.e., event impacts), other event related information including event impact 1408 (e.g., "extreme impact"), event description 1412 (e.g., "Fire Wuxi, China"), event timestamp 1416 (e.g., September 4, 2013 05:33 PST"), event card update timestamp 1420 (e.g., "September 4, 2013 22:13 PST"), event impact on selected supply and/or logistics chain 1424 (e.g., "Tier 2 Sites"; one impacted or 4% of Tier 2 Sites in selected supply and/or logistics chain, "Parts"; 100 impacted or 0.06% of parts in selected supply and/or logistics chain, "Tier 1 Sites"; 25 impacted or 20% of Tier 1 Sites in selected supply and/or logistics chain, "Products"; 500 impacted or 0.5% of products in selected supply and/or logistics chain, and "Customers"; 50 customers impacted or 0.5% of customers selected supply and/or logistics chain), message forwarding icon 1428, request further information icon 1432, watch list button 1436 which, if selected, enables the user to follow the corresponding event and be notified of updates to the event card, and dismiss event button 1440 which, if selected, dismisses the corresponding event without instantiating a disruption event workflow 516.

FIGS. 15A-C and 16A-B depict various impact chain views displayed on the client communication device 312. The impact chain view effectively shows the failure path within a supply and/or logistics chain for an event.

Figure 15A:
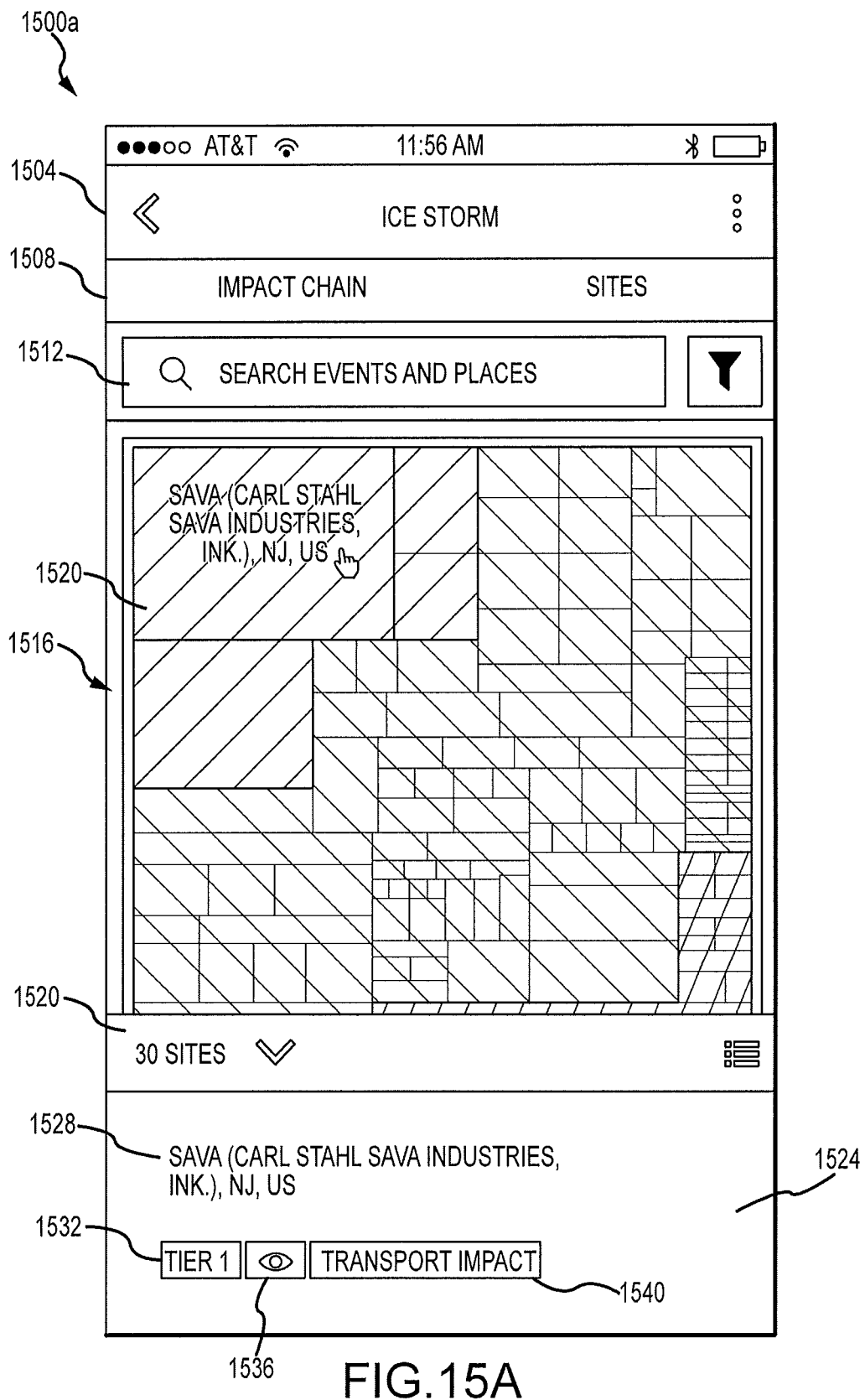
FIGS. 15A-C are screen shots according to an embodiment.

With reference to FIG. 15A, a first view 1500*a* includes a first descriptive strip 1504 identifying the event of interest (e.g., ice storm), a second descriptive strip 1508 identifying the view as an impact chain view on a selected object (e.g., sites). A search field 1512 receives search terms for events and places in connection with the selected supply and/or logistics chain impacted by the event. A relative event impact map 1516 is displayed including site tiles 1520 as described above. Information strip 1520 indicates a number of sites impacted by the event (e.g., 30 sites), each of which is listed below the strip. The depicted site entry 1524 includes enterprise supplier name 1528 (e.g., "Sava (Carl Stahl Sava Industries) and supplier geographic location (e.g., New Jersey, US). The view 1500*a* further includes tier identifier 1532 for the enterprise (e.g., tier 1), watch list button 1536, and transport impact option 1540.

Figure 15B:
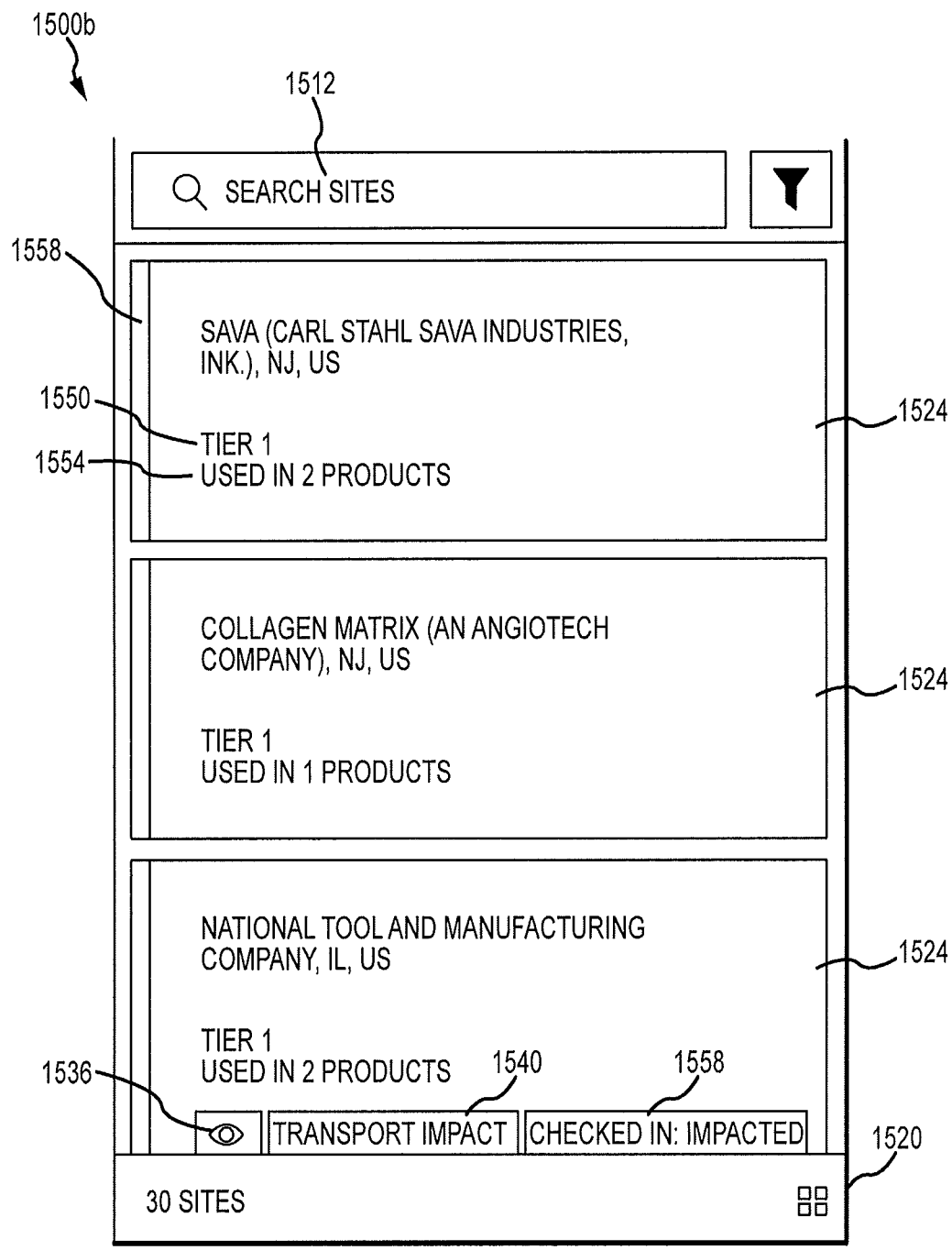

With reference to FIG. 15B, the user has tapped on the tile 1520 to obtain more information about the impacted site corresponding to file 1520 to provide a list of enterprise suppliers. As can be seen from the list entries 1524, each enterprise supplier includes not only enterprise supplier name and geographic location but also tier identifier 1550 (e.g., tier 1) and a number of products 1554 in which the part or component supplied by the corresponding enterprise supplier is used. Each list entry further includes a color bar 1558 indicating a level of severity associated with the corresponding site tile in the relative event impact map 1516. As can be seen from display 1500*b*, a message 1558 indicates that enterprise supplier "National Tool and Manufacturing Company" in Illinois, US, has checked in and indicated the site was impacted by the identified event.

Figure 15C:
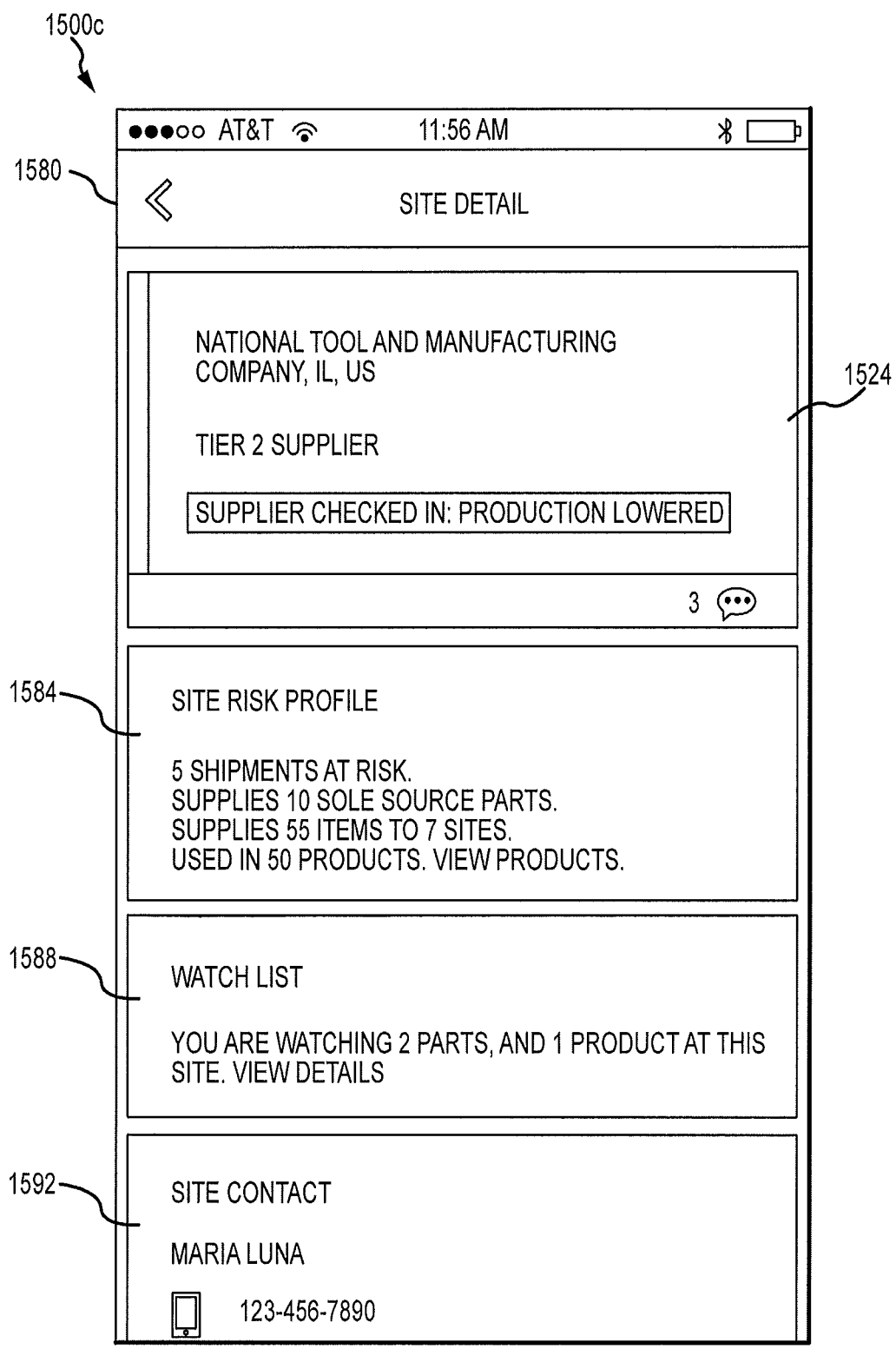

With reference to FIG. 15C, the user has, by tapping on the respective list entry, selected enterprise supplier "National Tool and Manufacturing Company" to access further information, which produces the view 1500*c* displayed on the client communication device 312. The view 1500*c* includes information strip 1580 indicating that the user has selected the option for site detail, the selected list entry 1524, a site risk profile 1584 (indicating 5 shipments at risk, the impacted site supplies 10 sole source parts and 55 items to 7 other sites, which are used in 50 products and including an icon to view the products if selected), watch list information 1588 (indicating the user is watching 2 parts and 1 product supplied by the site and including an option to view further details relating thereto), and contact information 1592 for the designated person of the site.

Figures 16A, 16B:
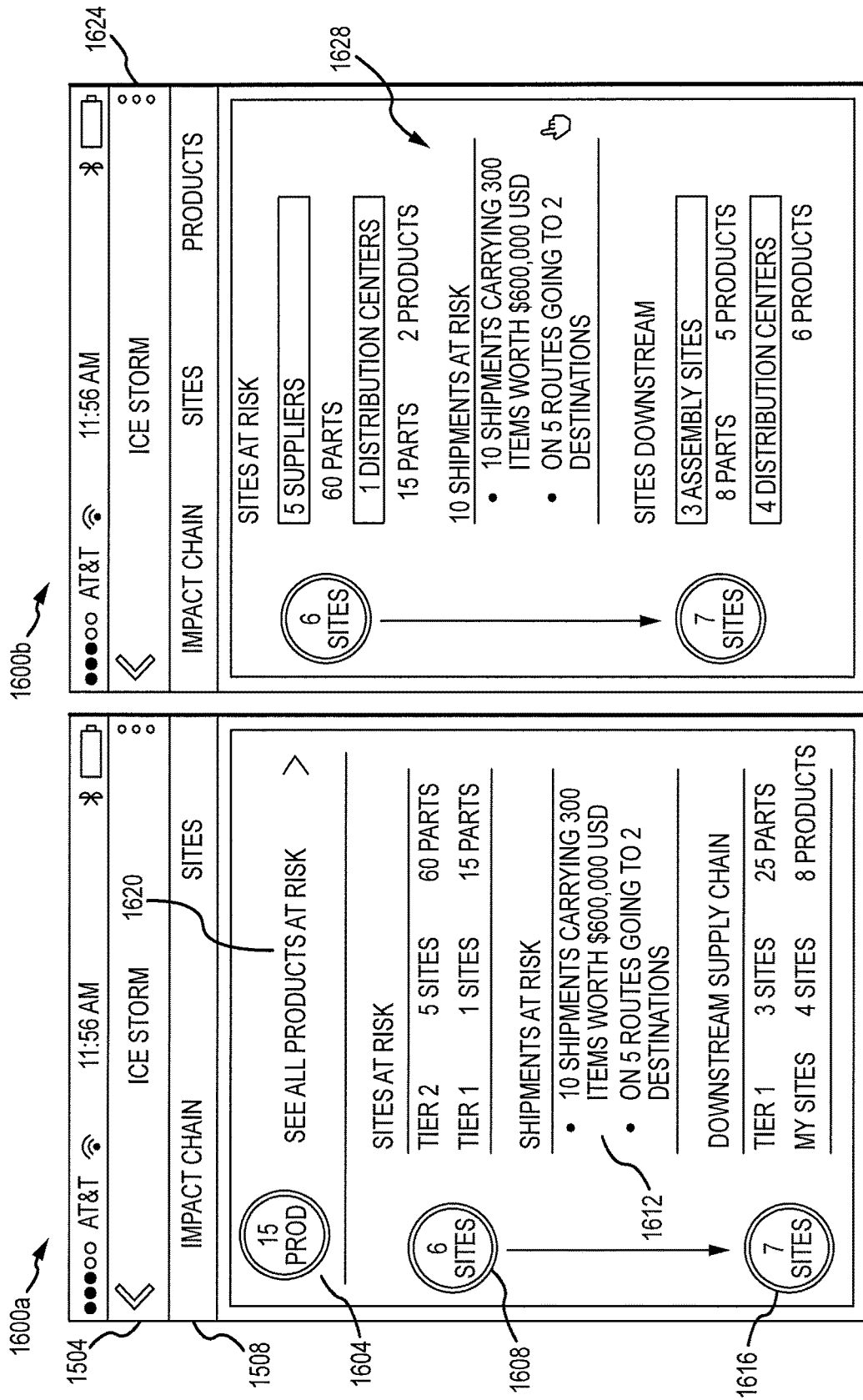
FIGS. 16A-B are screen shots according to an embodiment.

With reference to FIGS. 16A-B, further impact chain views are depicted. The view 1600*a* of FIG. 16A includes a number of products at risk or impacted by the identified event 1604 (e.g., 15), a number of sites at risk 1608 (e.g., 5 tier 2 sites and 60 parts associated therewith and 1 tier 1 site and 15 parts associated therewith), a number of shipments at risk 1612 (e.g., 10 shipments carrying 300 items worth $600,000 USD and on 5 routes going to 2 destinations), and downstream supply chain information 1616 (e.g., 3 tier 1 sites and 25 parts and 4 sites associated with the user and 8 products associated therewith). The view 1600*b* of FIG. 16B is displayed in response to the user selecting the "See all products at risk" icon 1620 in view 1600*a*. The view 1600*b*, in information strip 1624 indicates where the user has been (e.g., impact chain, sites, and finally products). The view 1600*b* provides further information 1628 on the number of sites (e.g., 5 suppliers of 60 parts and one distribution center supplying 15 parts and two products) and shipments at risk and downstream sites impacted indirectly by the event due to part or component supply disruptions (e.g., 2 assembly sites supplying 8 parts and 5 products and 4 distribution centers supplying 6 products).

Typically, the RIM and impact chain views can be accessed by the user interacting with a view of the event card for the selected event. The impact chain view can also be accessed through the impact chain view.

The Graph Data Structures 508

The graph data structures 508, which are used in generating the relative event impact map 512 and impact chain views of FIGS. 15A-C and 16A-B, is a tree-type structure with nodes and node connecting branches. Each node represents an object or item, including without limitation a tier 1-4 enterprise, tier 1-4 enterprise site, part, component, product, person, shipment enterprise or freight carrier, shipment, customer, route, "BOM" for requirement or specification of bill of materials, "Event" for an event associated with an event card 504, "SCE" for a supply chain event, "CSMP" for certified supply chain management professional, BSI. Each node is associated with a description of the corresponding object and can be color coded by associated enterprise. Each interconnecting branch indicates a type of relationship between the respective interconnected nodes, including without limitation, "alternate" for alternate part or component (e.g., where a manufacturer or supplier has different designations for the same part or component, different parts or components that are interchangeable, or multiple dislocated sites manufacturing the same part or component), "sole source" for sole part or component, "part" for part or component, "FG" for finished good, "ship to" for shipment to destination, "works" for or employed by, "emergency contact", "knows" for business association, "buys from", "sells to", "certified" for certification by a standards organization, BSI, and ISO. The graph data structures can divide the items in the supply chain so as to generate a set of graph data structures for a specific part, component, or product, such that the enterprise responsible for that part, component or product can view selectively the segments of the upstream and downstream segments of the supply and/or logistics chain responsible for manufacturing or using that selected part, component, or product. This is opposed to a site-centric or site-level view, which shows all parts, components, and products supplied by each depicted site, which, for sites handling multiple different parts, components, or products, can produce a very complex and difficult-to-traverse graph database. The use of a part, component, or product-centric set of graph data structures can not only provide a simpler graph database to traverse by omitting objects in the supply and/or logistics chain that are not of interest to the user but also enable users to view how a selected part or component flows through the supply and/or logistics chain.

Figure 17:
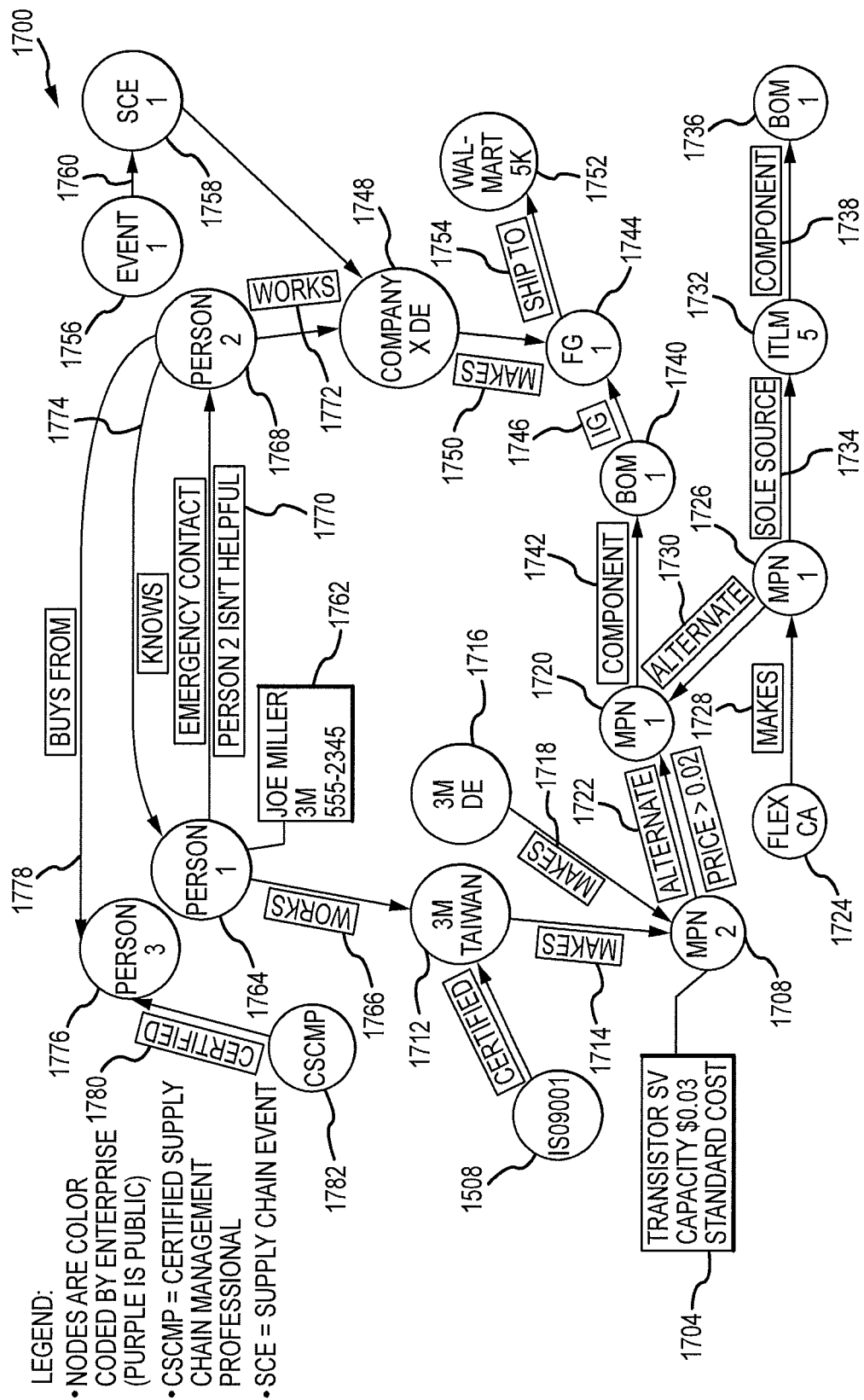
FIG. 17 is a screen shot according to an embodiment.

FIG. 17 demonstrates a first example of display 1700 showing graph data structures 508. In FIG. 17, the rectangular node 1704 refers to a description of the selected part or component (which is described as "Transistor 5V capacity $0.01 Standard cost") and rectangular node 1762 refers to the designated contact person for 3M™ (i.e., "Joe Miller 3M 555-3028"), which, as shown by node 1764 and branch 1766 entitled "WORKS", is employed by the company (3M™) manufacturing the selected product "MPN 2". The circular nodes are identified as follows: node 1708 as "MPN 2" (which identifies the selected part described by rectangular node 1704), node 1712 as "3M Taiwan" (which is a site owned by 3M™ located in Taiwan and, as shown by branch 1714 described as "MAKES", makes part MPN2 at the Taiwan site and, as shown by branch 1784 described as CERTIFIED" and node described as "ISO 9001" is a certified facility (ISO 9001 is a family of quality management systems standards is designed to help organizations ensure that they meet the needs of customers and other stakeholders while meeting statutory and regulatory requirements related to a product), node 1716 as "3M DE" (which is a site owned by 3M™ located in Germany and, as shown by branch 1718 described as "MAKES", makes part MPN2 at the German site), node 1720 as "Item 1" (which, as shown by branch 1722 described as "ALTERNATE", has part MPN2 as an alternate part having price=$0.02 and, as shown by branch 1730 described as "ALTERNATE", is an alternate part for MPN 2 in Item 1), node 1724 as "Flex CA" (which is a site owned by Flextronics International™ in California), node 1726 as "MPN 1" (which identifies a part, that, as shown by branch 1728 described as "MAKES", is made by Flextronics International's™ site in California), node 1732 as "Item 5" (which, as shown by branch 1734 described as "SOLE SOURCE", has part MPN 1 as a sole part (meaning there is no alternate part to replace it), node 1736 as "BOM 3" (which, as shown by branch 1738 described as "COMPONENT", bill of materials "BOM 3" requires part Item 5 as a specification in another part or product (not shown)), node 1740 as "BOM 1" (which, as shown by branch 1742 described as "COMPONENT" (which means that a part or component is required as a part or component by a bill of materials), bill of materials "BOM 1" requires part Item 1 as a specification in a product "FG 1"), node 1744 as "FG 1" (which, as noted, is a product, or finished good, and, as shown by branch 1746 described as "FG", has Item 1 as a part as required by BOM 1), node 1748 as Company X DE (which is a site owned by Company X in Germany and, as shown by branch 1750 labeled "MAKES", manufactures product "FG 1"), node 1752 as "Walmart $K" (which is the retailer and/or brand owner selling product "FG 1" and which product "FG 1", as shown by branch 1754 described as "SHIP TO", is shipped to the retailer "Walmart $K), node 1756 as "Event 1" (which refers to an event identified as "Event 1"), node 1758 as "SCE 1" (which refers to a supply chain event impacting the site associated with node 1748 and which, as shown by branch 1760, is the same as Event 1 (while an "Event" data structure contains or is linked to publicly accessible information about an event an "SCE" data structure contains or is linked to non-public event information such as collaboration messages, activities performed, and comments generated during event mitigation), node 1768 as "Person 2" (which, as shown by branch 1772 described as "WORKS" is employed by Company X and, as shown by branch 1770 described as "EMERGENCY CONTACT PERSON 2 isn't helpful" and branch 1774 described as "KNOWS", is associated with "Person 1" of node 1764 and is not helpful in the event of event mitigation involving Company X), and node 1776 as "Person 3" (which, as shown by branch 1778 described as "BUYS FROM", buys Item 1 from 3M™ and, as shown by branch 1780 described as "CERTIFIED" and node 1782 labeled "CSMP", is a Certified Supply Chain Management Professional). As can be seen from the above, branches and/or nodes can include embedded comments to describe not only the nature of the relationship but also describe or comment on one or more of the interconnected items, such as the level of expertise or helpful of a person based on previous interactions regarding site performance or risk mitigation. As will be further appreciated, each of the nodes and branches can be further linked to data structures relating to the corresponding branch or node.

Figure 18:
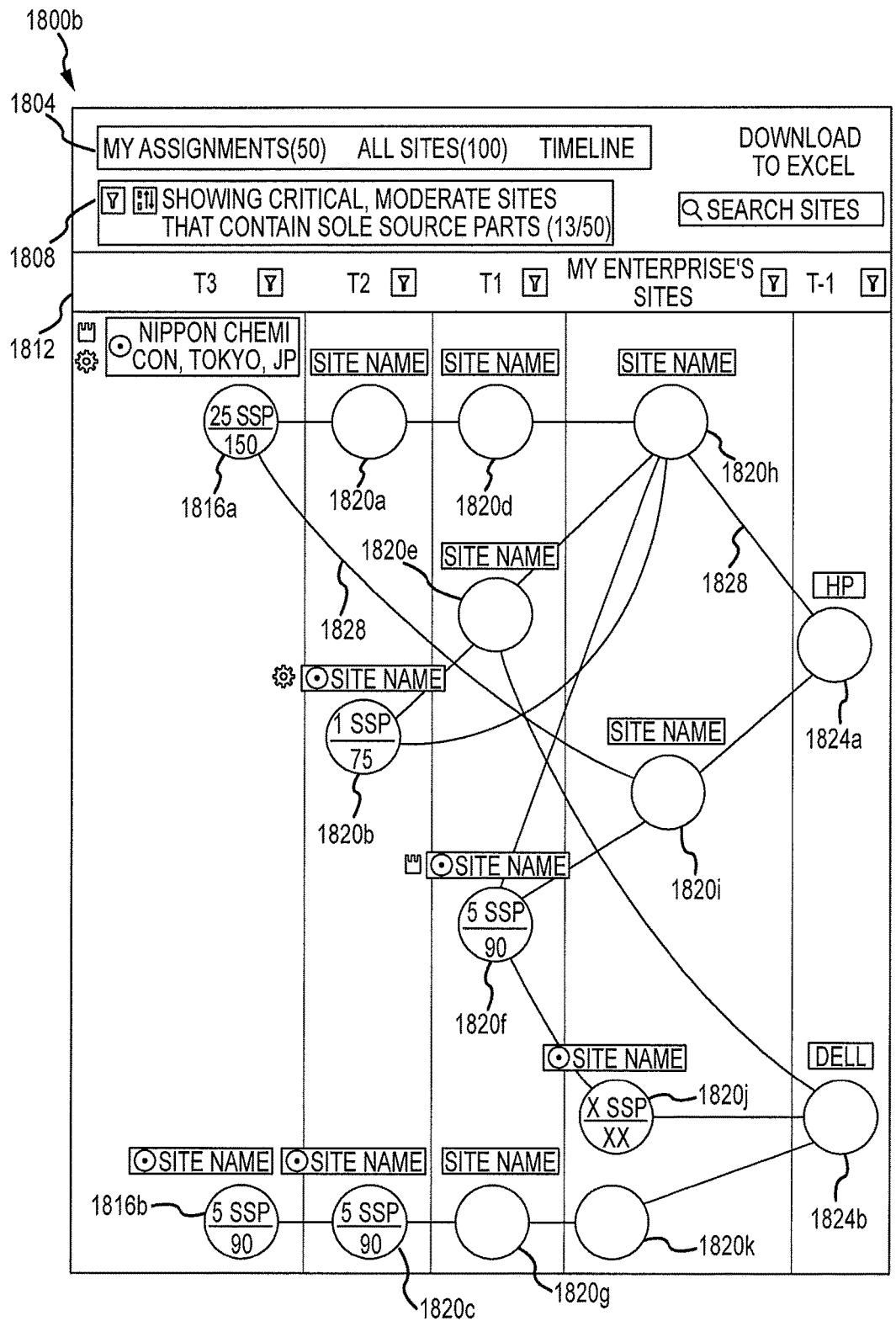
FIG. 18 is a screen shot according to an embodiment.
Figure 19:
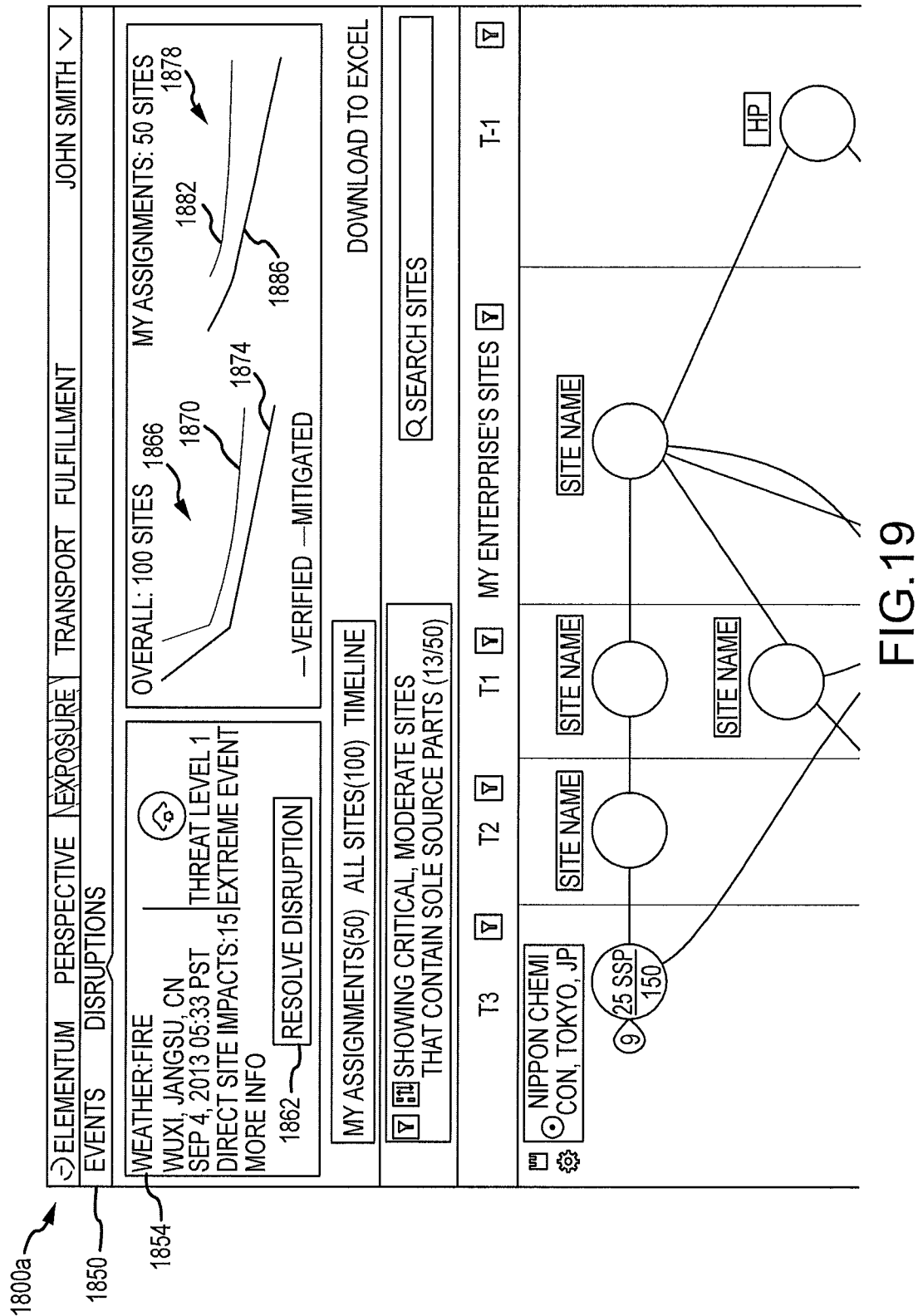
FIG. 19 is a screen shot according to an embodiment.

Based on the set of graph data structures, FIGS. 18-19 collectively depict another example of a view 1800 displayable on a client communication device, with FIG. 18 being the lower portion of the view and FIG. 19 being the upper portion. The view 1800a (FIG. 19) includes a descriptive strip 1850 showing that the user (John Smith) has selected "disruptions" instead of "events". An event description 1854 indicates that the first event disruption workflow assigned to the user is for "Weather: fire Wuxi, Jiangsu, CN September 24, 2013 05:33 PST Direct Site Impacts 15". Icon 1858 indicates that the threat posed by the event is level 1, or extreme event, and icon 1862 indicates that the event is to be resolved. Impact chain graph 1866 indicates that the event has impacted 100 sites, with line 1870 indicating a number of sites believed to be mitigated and line 1874 a number of sites verified as being mitigated. For sites assigned to the user, graph 1878 indicates that the event has impacted 50 sites assigned to the user, with line 1882 indicating a number of sites believed to be mitigated and line 1886 a number of sites verified as being mitigated. The view 1800a-b indicates, by descriptive field 1804 (FIG. 18), that the view 1800a-b is customized for the client communication device user and by descriptive field 1808 that the view shows critical and moderate sites (with respect to risk caused by the event associated with the event description 1854) that contain sole source parts. Descriptive strip 1812 shows the tier (i.e., "T3" for Tier 3, "T2" for Tier 2, and "T1" for Tier 1) for each site icon depicted in that column and which tier site icons are associated with the user (e.g., by "My Enterprise's Sites"). Tier 3 thus has plural sites, each associated with a respective site icon 1816a-b; Tier 2 thus has plural sites, each associated with a respective site icon 1820a-k; and Tier 1 thus plural sites, each associated with a respective site icon 1824a-b. The lines 1828 interconnecting the various site icons indicate part, component, or product supply relationships between the various nodes. For example, a first corresponding to node 1816a supplies a first part to a second site corresponding to node 1820c, which in turn supplies a second part to a third site corresponding to node 1820g, which in turn supplies a third part to a fourth site corresponding to node 1820K, which in turn provides a fourth part to a fifth site corresponding to node 1824b. The site icons 1816a, 1820b, and 1820 f are bolded relative to the other site icons indicating that impacted by the event while the lighter colored site icons 1816b, 1820a, c, d, e, g, h, i, j, and k and 1824a have not been impacted by the event. The site icons depicted in view 1800b are an impact map; that is, it represents only a portion of the supply and/or logistics chain impacted by the event associated with the event description 1854 to a level of moderate or critical risk and that supplies sole source parts (via Nippon Chemical Conglomerate™). The ability to depict filtered portions of the supply and/or logistics chain can enhance substantially not only viewer convenience but also consumption of computational resources, bandwidth and processing power.

Figure 20:
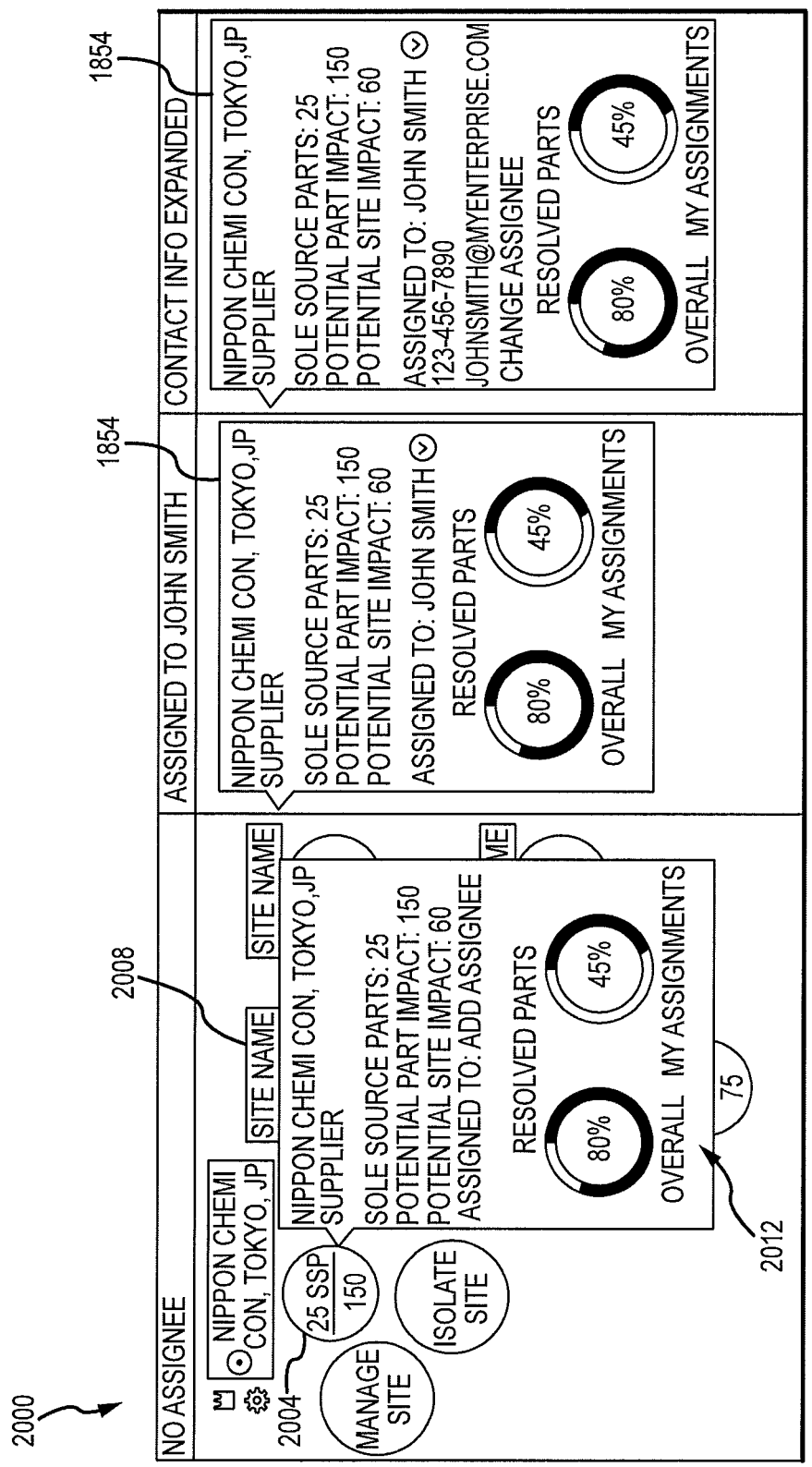
FIG. 20 is a screen shot according to an embodiment.

Based on the set of graph data structures, FIG. 20 is yet another example of an impact chain view 2000 displayable on a client communication device. The view 2000 indicates, for a selected enterprise supplier (Nippon Chemical Conglomerate™ (or "Nippon") out of Tokyo, Japan) corresponding to site icon 2004, by descriptive field 2008, that the selected enterprise supplier is the sole source for 25 parts and by the event of the prior paragraph has a potential part impact of 150 parts and a potential site impact of 60 sites. The images 2012 indicate a percentage of resolved parts overall and assigned to John Smith for resolution. Compared to FIG. 18, it can be seen that the text boxes were opened on top of the impact chain at the request of the user for more detailed information.

Figure 21:
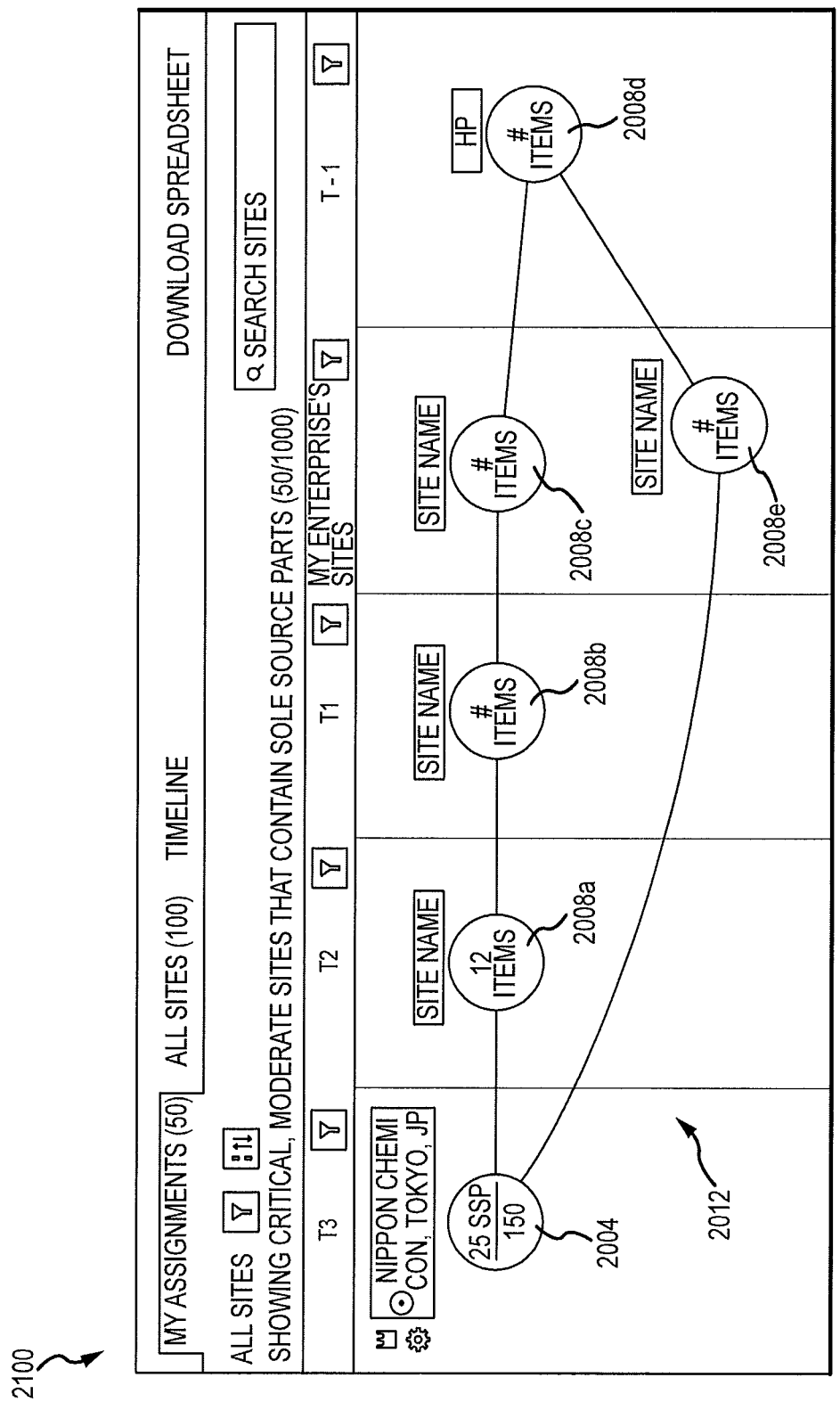
FIG. 21 is a screen shot according to an embodiment.

Based on the set of graph data structures, FIG. 21 is yet another example of an impact chain view 2100 displayable on a client communication device. The view 2100, in the impact graph 2012, indicates, for the event identified above in connection with FIGS. 18-19, that the enterprise supplier associated with enterprise supplier icon 2004, namely Nippon Chemical Conglomerate™, is the sole source for 25 parts and has a potential part impact of 150 parts. The remaining site icons 2008a-e indicate the downstream sites impacted as a result of the upstream disruption at Nippon Chemical Conglomerate™. As shown by the interconnecting lines, Nippon™ supplies items directly to sites 2008a and e.

The impact change view or graph can enable a user to filter and sort convenient on selected object types (e.g., customer, product, part, component, site, etc.) and thereby reorient and align the graph in a beneficial manner to mitigate the effect of an event. The various views enable a user to present customized views, such as isolating a site for further review (e.g., to view how the site is connected to the rest of the sites in the supply and/or logistics chain, isolate the sub-graph for a selected site, etc.).

The Impact Assessment Analyzer 500

The impact assessment analyzer 500 that generates the map and other views discussed above can be user specific; that is, the user can specify how to weight events depending on the type and/or location of event relative to sites and/or shipping routes of a selected supply and/or logistics chain, number and types of news sources for the event, and the like. In other words, different supply and/or logistics chains and/or users within a specific supply and/or logistics chain can have different algorithms to determine the event impact map. The impact assessment analyzer 500 can weigh multiple factors, such as product and customer impact, to enable a user to start drilling down on the sites that matter most.

Figure 22:
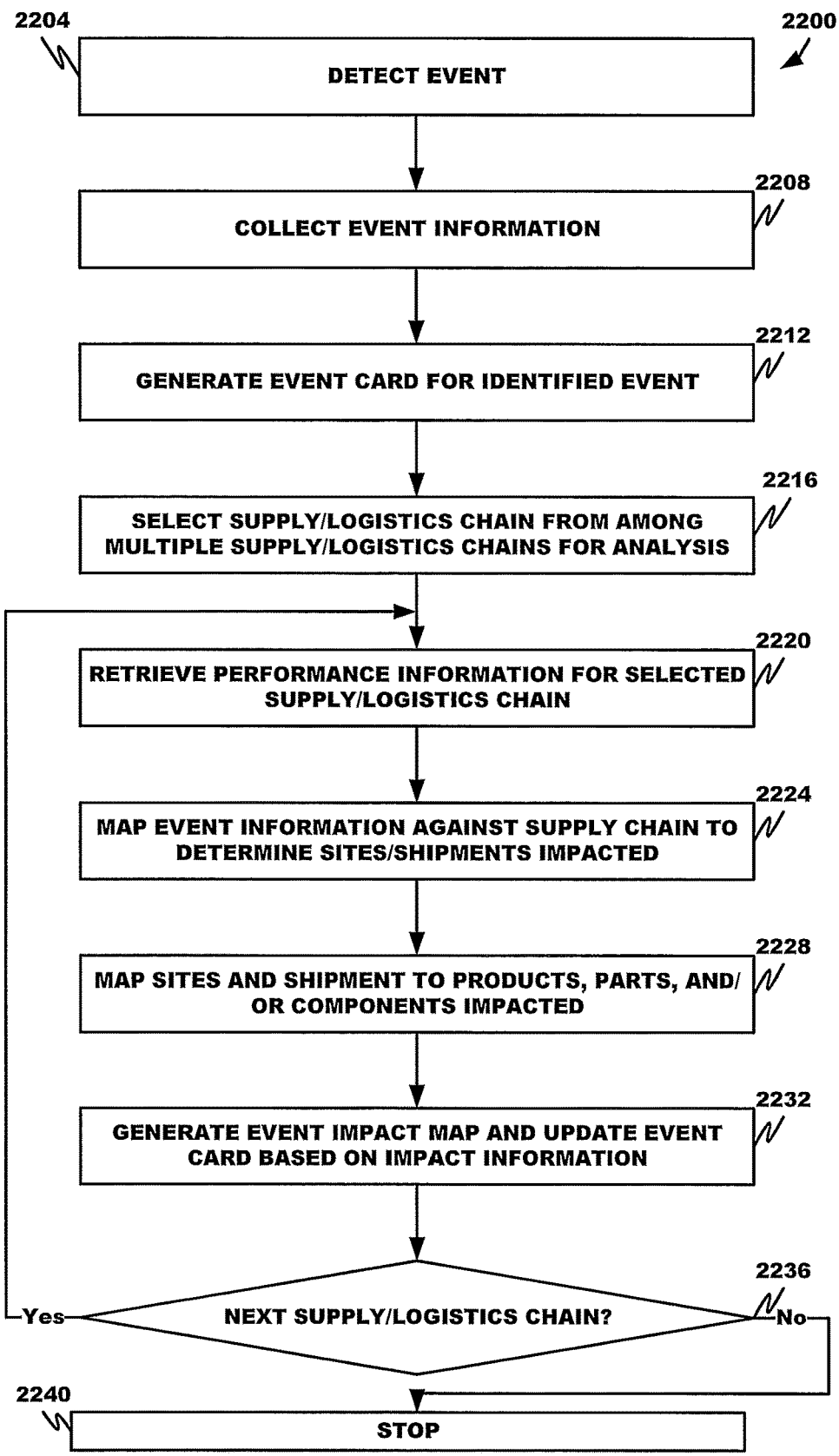
FIG. 22 is a flow chart of an exemplary impact assessment analyzer.

FIG. 22 depicts a microprocessor executable method of operation 2200 of the impact assessment analyzer 500.

In step 2204, the analyzer 500 receives a notification that an event has been detected by the supply and/or logistics chain monitoring system 300.

In step 2208, the analyzer 500 collects event information relating to the detected event, including type and subtype of event, geographic location of the event (including geo-tags (or latitudinal and longitudinal coordinates), zone of impact of the event, and the like. The zone of impact of the event can be based on the type or subtype of event, severity of event impact (e.g., based on a measurable parameter independent of the impact on the selected supply and/or logistics chain, such as the Richter scale for an earthquake), news reports, and/or reports from sites in the area of the event impact.

In step 2212, the analyzer 500 generates an event card 504 for the identified event.

In step 2216, the analyzer 500 selects a supply and/or logistics chain from among multiple supply and/or logistics chains for analysis.

In step 2220, the analyzer 500 retrieves performance information and the corresponding graph database for the selected supply and/or logistics chain.

In step 2224, the analyzer 500, using the graph database for the selected supply and/or logistics chain, maps the event information against the supply chain to determine the sites and/or shipments impacted by the event. This can be done by comparing geo-tags for the event against geo-tags for each of the sites and current shipments in the selected supply and/or logistics chain.

In step 2228, the analyzer 500 receives input from the graph database analyzer 528 (discussed below) regarding its traversal of the corresponding graph database for the selected supply and/or logistics chain. The graph database analyzer 528 maps the impacted sites and shipments against the parts, components, and/or products produced or supplied by the impacted sites or carried by the impacted shipments to determine impact information, such as a degree of impact on each site, shipment, part, component and product and/or a severity or risk associated with the overall impact of the event on the selected supply and/or logistics chain.

The analyzer 500 normally applies a supply chain risk analysis in the context of an event or other issue (e.g., object). For a site supply chain risk analysis, the analyzer 500 can draw on the following metrics determined for each object:

- [Tile Location] 1. Number of final products or finished goods at risk per site based on the parts and sole sourced parts produced by each of the impacted site(s) for the selected enterprise customer's supply and/or logistics chain. This calculation determines the unique interconnectivity of the selected site's parts to the end users products. The location of the site tile for the selected site on the RIM is determined by the analyzer 500 by normalizing the selected sites final products-at-risk count and determining a relative count. Site tiles are "painted" or created starting in the upper right corner of the map and placed in concentric arcs expanding from the corner.
- [Tile Size] 2. Profit (or revenue) generated from the products-at-risk per each site (from metric number 1). The profit generated from the products which the parts at the impacted supplier site go into is aggregated and normalized across all at-risk sites within the event. The higher the value, the more risk from the parts at that site and the larger the tile. The profit from finished goods made out of parts made at each site at risk is aggregated. The normalized sites are broken into quartiles and the tiles are sized.

There are three sizes for tiles:
0-25%=Small,
26-50%=Small,
51-75%=Medium, and
76-100%=Large

- [Tile Color] 3. Aggregated Part information per site: The color is determined by looking at the individual parts within a site and determining the aggregate component lead time−[(inventory on-hand+inventory in-transit)/ daily component consumption]=Adjusted lead time (ALT). The higher the ALT values above zero, the longer the expected shortage in part supply before new orders can fulfill demand.

The impacted sites can be broken into quartiles based on the adjusted lead time (highest risk from greatest positive ALT) and colored by the risk quartile:
0-25%=Green,
26-50%=Yellow,
51-75%=Orange, and
76-100%=Red.

In step 2232, the analyzer 500 generates a RIM and updates the event card based on the impact information. The size of each tile is based on the risk associated with the object associated with the tile.

In decision diamond 2236, the analyzer 500 selects a next supply and/or logistics chain for analysis and returns to step 2220. If there is no supply and/or logistics chain remaining for analysis, the analyzer 500, in step 2240, terminates execution.

The Graph Database Analyzer 528

The graph database analyzer 528 can traverse the graph database for a selected supply and/or logistics chain based on user selected parameters and a selected event. By traversing the graph database, the analyzer 528 can determine not only what sites are impacted directly by an event and what parts, components, or products from that site are impacted but also what downstream sites and parts, components, and products are indirectly impacted by the upstream disruption.

Figure 23:
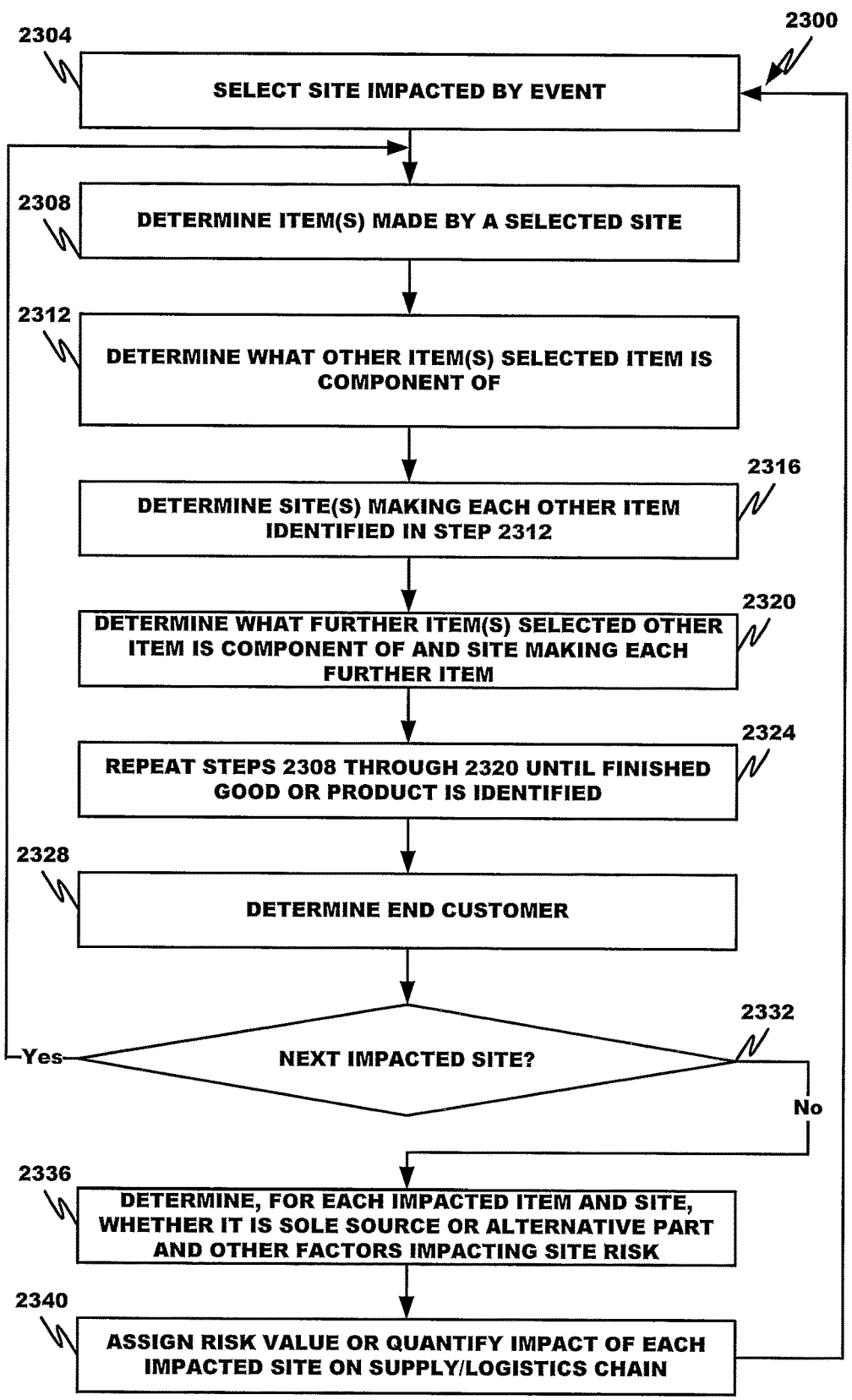
FIG. 23 is a flow chart of an exemplary graph database analyzer.

FIG. 23 depicts a microprocessor executable method of operation 2300 of the graph database analyzer 528. The method of operation 2300 effectively starts at the directly impacted site and follows the impacted raw material, part, or component flow downstream through the supply chain to assess what other parts, components, or products, for each site and associated enterprise, are directly and indirectly impacted by the event and whether the impacted parts or components are sole source and/or alternate parts or components. A product or component is a sole source part or component when all of the following are true: (1) A manufacturer or supplier does not assign a different designation for the same part or component; (2) The manufacturer or another entity does not make different parts or components that are interchangeable; and (3) The manufacturer does not have another site outside of the event impact zone manufacturing the same part or component. If any of the above is true, the part or component has an alternate source. While the existence of alternate parts or components and absence of sole source parts or components lowers the risk profile of an event on a site and downstream product, it does not change the fact that a site or downstream product has been impacted by an event.

In step 2304, the analyzer 528 selects a site in the selected supply and/or logistics chain impacted by an event.

In step 2308, the analyzer 528 determines the item(s) (e.g., raw materials, parts, components, and/or products) made by the selected site.

In step 2312, the analyzer 528 determines, such as from the bill of materials of a downstream part, component or product, what other item(s) the selected item is a component of.

In step 2316, the analyzer 528 determines the site(s) making each other item identified in step 2312.

In step 2320, the analyzer 528 determines, such as from a bill of materials, what further item(s) the selected other item is a component of and the site making the further item(s).

As shown in box 2324, the analyzer 528, repeats steps 2308 through 2320 until a finished good or product is identified.

When the finished good or product is identified, the analyzer 528, in step 2328, determines the end customer for the finished good or product to complete the impacted branch of the selected supply and/or logistics chain.

In decision diamond 2332, the analyzer 528 determines whether there is a next impacted site in the selected supply and/or logistics chain and, if so, returns to and repeats steps 2308 through 2328. When there is no next impacted site remaining to be analyzed, the analyzer 528 proceeds to step 2336.

In step 2336, the analyzer 528 determines, for each impacted item and site, whether it is a sole source or alternate part and other factors impacting the risk to be assigned to each of the impacted sites. Examples of other factors considered include demand of impacted parts, components, or products, inventory levels of impacted parts, components, or products, outstanding orders for the impacted part, component or product, and other enterprise selected criteria relevant to how the enterprise evaluates and quantifies risk and potential loss from a certain site. These other factors can also be used in developing a strategy for mitigating the impact of an event.

In step 2340, the analyzer 528 assigns a risk value or quantifies the impact on each impacted site and/or of each impacted site on the supply and/or logistics chain and/or ranks the various impacted and non-impacted sites based on the assigned risk value or quantified impact.

The Graph Database Generator 524

The graph database generator 524 can generate the graph database for a selected supply and/or logistics chain based on user selected parameters. The generator 524 can generate the database by selecting an arbitrary site, whether Tier 1, 2, 3, or 4, and navigating from the selected site through the various sites of the selected supply and/or logistics chain. The generator 524 can develop the graph database by accessing relevant data in a database containing data structures describing the supply and/or logistics chain. The method 2400 of FIG. 24 does not generate the upper portion of the graph database of FIG. 17 showing human actors; however, the method 2400 can be modified by one of ordinary skill in the art to collect and populate this portion of the database.

The generator 524, in step 2404, selects a supply and/or logistics chain for creating a set of data structures describing the chain's topology.

In step 2408, the generator 524 selects an arbitrary site in the selected supply and/or logistics chain.

In step 2412, the generator 524 determines the item(s) made and/or received by the selected site and the site information for each such site. Site information includes, for example, geo-location, owner, operator, designated contact person, type of facility (e.g., warehouse, factory, etc.), capacity of facility, and the like.

In step 2416, the generator 524 determines what other item(s) each manufactured item is a component of, sites making each other item identified, and information for such site(s).

In step 2420, the generator 524 determines, for each received item, the sites making each received item, and information for such site(s).

In step 2424, the generator 524 repeats steps 2408 through 2420 for each site in the selected supply and/or logistics chain.

In step 2428, the generator 524 determines the customer for the selected supply and/or logistics chain.

In decision diamond 2432, the generator 524 determines, whether there is a next supply and/or logistics chain. If so, the generator returns to and repeats steps 2404 through 2428 for the next supply and/or logistics chain. When there are no further supply and/or logistics chains to be analyzed, the generator 524, in step 2436, creates a linked set of graph data structures for each selected supply and/or logistics chain.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARMO Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to a computer network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the concepts of this disclosure can be applied to analyze and represent the effect of an event impacting a network generally, such as a computer network (e.g., the nodes are logical or physical function components, the branches are communication pathways between the components, the event is a malfunction or virus infestation, malware infestation, denial of service attack, and the like, and the impact is an improper operation, malfunction, decreased bandwidth or processing resource constriction), telecommunications network (e.g., the nodes are logical or physical function components, the branches are communication pathways between the components, the event is a malfunction or virus infestation, malware infestation, denial of service attack, and the like, and the impact is an improper operation, malfunction, decreased bandwidth or processing resource constriction), transportation network (such as railway network, road network, air carrier network, and the like, where the node is a depot, bus station, intersection, and the like, the branch is a rail, road, or air segment, the event is heavy traffic, branch damage such as from a weather event, and the impact is traffic constrictions or choke points at other parts of the network), power grid (where the node is a utility station or sub-station, the branch is an electrically conductive pathway, the event is malfunction, conductive pathway damage such as from a weather event or abnormal energy demands, and the impact is power outages), and the like. Each of these applications has nodes and branches similar to the graph database discussed above.

Figure 24:
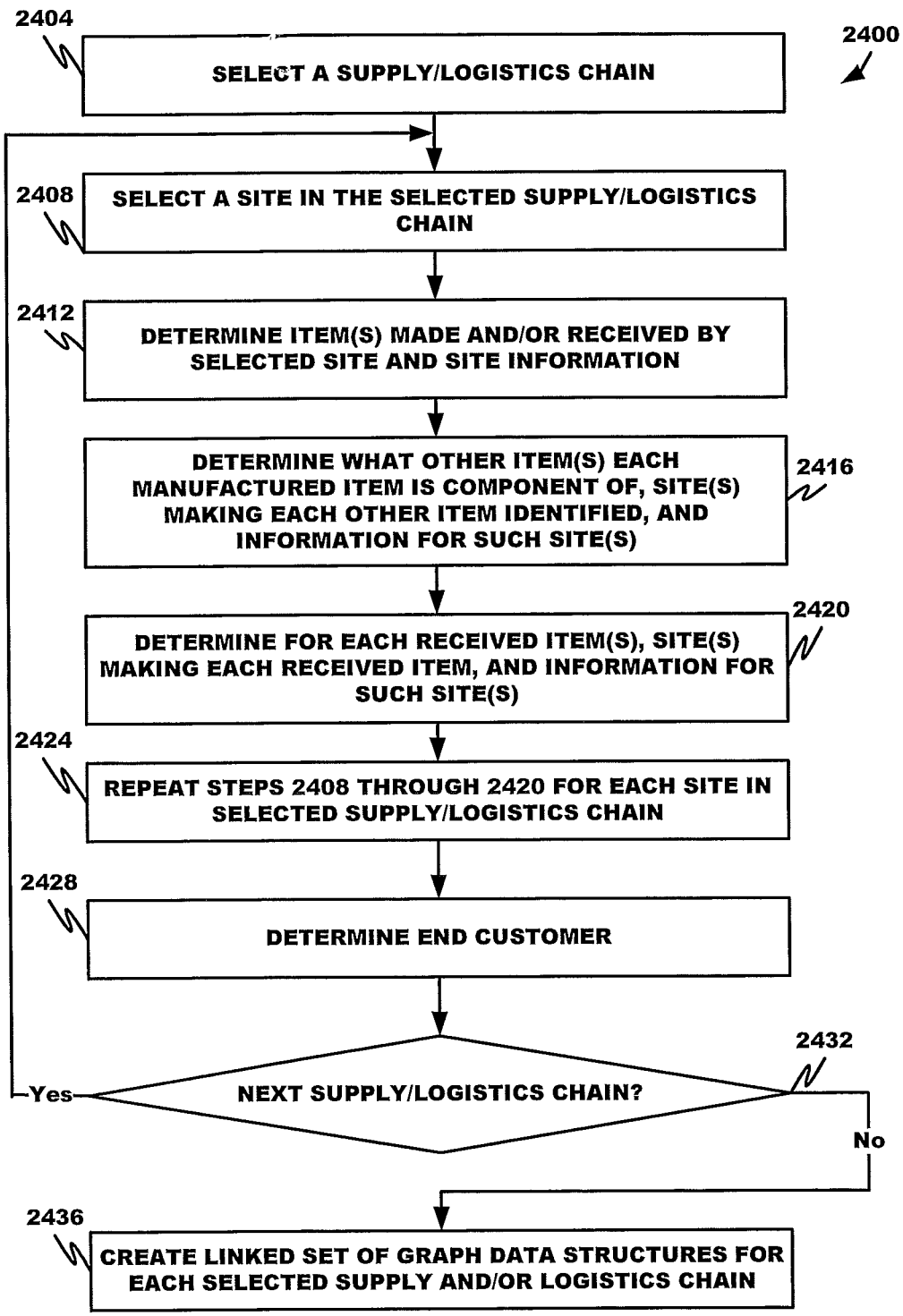
FIG. 24 is a flow chart of an exemplary graph database generator.

In another embodiment, any of the steps described in connection with FIGS. 22-24 can be performed manually, including input, such as inputting event information, information describing the supply and/or logistics chain, and the like.

In another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    one or more processors;
    a non-transitory machine-readable medium having instructions stored thereon, the instructions when executed by the one or more processors cause:
    using the one or more processors, receiving a record of an event that occurred during manufacturing of a product and that has an impact on a supply chain, which comprises sites that produce products and parts manufacturing of which depends on availability of the product, wherein the record of the event includes a first geo-tag indicating a geographic location of the event and electronically transmitting the geographical location of the event to the one or more processors by a global positioning system;
    using the one or more processors, obtaining data about the supply chain comprising the sites that are each associated with a second geo-tag indicating a geographic location of the site, parts manufactured by the site, and products associated with the parts;
    using the one or more processors, identifying a set of the sites that is impacted by the event, which occurred during manufacturing of the product, by comparing all geo-tags indicating the geographic locations of the event with all geo-tags indicating the geographical locations of the sites in the set of the sites;
    using the one or more processors, determining an impact of the event on the parts associated with the sites in the set of the sites;
    using the one or more processors, for each of the set of the sites, determining a normalized number of the products which manufacturing by the site depends on availability of the product, and a normalized adjusted lead time of the parts which manufacturing by the site depends on availability of the product, the normalized number of the products being normalized across a range of counts of products manufactured by the sites and across a range of counts of products manufactured by the site;
    using the one or more processors, generating, and displaying on a display of a computer device, a tile interface comprising a plurality of tiles each corresponding to one site in the set of the sites, and comprising determining respective positions of the plurality of tiles where a first tile of the plurality of tiles corresponding to a first site associated with a greater normalized number of products is positioned in a first position and a second tile of the plurality of tiles corresponding to a second site associated with a lesser normalized number of products is positioned in a second position, determining respective colors of the plurality of tiles where the first tile of the plurality of tiles corresponding to the first site associated with a greater normalized adjusted lead time is shaded in a first color and the second tile of the plurality of tiles corresponding to the second site associated with a lesser normalized adjusted lead time is shaded in a second color.

2. The system of claim 1, further comprising instructions which when executed by the one or more processors cause:
    using the one or more processors, identifying a third site of the sites that is downstream of the first site in the set of the sites in the supply chain;
    using the one or more processors, determining a normalized number of products associated with the third site and a normalized adjusted lead time of the parts associated with the third site;
    updating the tile interface to add a tile corresponding to the second site having a particular position based on the normalized number of products associated with the third site and a particular color based on the normalized adjusted lead time of the parts associated with the third site.

3. The system of claim 2 further comprising instructions which when executed by the one or more processors cause:
    using the one or more processors, receiving an indication that the impact of the event is mitigated at the first site;
    using the one or more processors, updating the tile interface by removing the tile corresponding to the first site and the tile corresponding to the third site;
    using the one or more processors, for each remaining site in the set of the sites, determining an updated normalized number of products associated with the site and an updated normalized adjusted lead time of the parts associated with the site;
    using the one or more processors, generating a second tile interface comprising a plurality of tiles each corresponding to one site in the remaining sites of the set of the sites.

4. The system of claim 1, further comprising instructions which when executed by the one or more processors cause:
    using the one or more processors, receiving an instruction to re-generate the tile interface to correspond to the parts associated with the sites in the set of the sites;
    using the one or more processors, generating a second tile interface comprising a plurality of tiles each corresponding to a part of the parts associated with the sites in the set of the sites, wherein each tile of the plurality of tiles includes a part name, and a number of products impacted by the event.

5. The system of claim 1, further comprising instructions which when executed by the one or more processors cause:
    using the one or more processors, receiving an instruction to re-generate the tile interface to correspond to the products associated with the sites in the set of the sites;
    using the one or more processors, generating a second tile interface comprising a plurality of tiles each corresponding to a product of the products associated with the sites in the set of the sites, wherein each tile of the plurality of tiles includes a product name, and a number of products impacted by the event.

6. The system of claim 1, further comprising instructions which when executed by the one or more processors cause:
    using the one or more processors, detecting that a user has selected a tile of the tiles via the tile interface;

using the one or more processors, generating an information display including an emergency contact at the corresponding site, and an option to indicate that the site is mitigated.

7. The system of claim 1, further comprising instructions which when executed by the one or more processors cause:
using the one or more processors, determining that a first site of the set of the sites is a sole source for a first part impacted by the event;
using the one or more processors, in the tile interface, providing an indication that the first site is the sole source for the first part.

8. A method comprising:
using one or more processors, receiving a record of an event that occurred during manufacturing of a product and that has an impact on a supply chain which comprises sites that produce products and parts manufacturing of which depends on availability of the product, wherein the record of the event includes a first geo-tag indicating a geographic location of the event, wherein the geographical location of the event is electronically transmitted to the one or more processors by a global positioning system;
using the one or more processors, obtaining data about the supply chain comprising the sites that are each associated with a second geo-tag indicating a geographic location of the site, parts manufactured by the site, and products associated with the parts;
using the one or more processors, identifying a set of the sites that is impacted by the event, that occurred during manufacturing of the product, by comparing all geo-tags indicating the geographic locations of the event with all geo-tags indicating the geographical locations of the sites in the set of the sites;
using the one or more processors, determining an impact of the event on the parts associated with the sites in the set of the sites;
using the one or more processors, for each of the set of the sites, determining a normalized number of the products which manufacturing by the site depends on availability of the product, and a normalized adjusted lead time of the parts which manufacturing by the site depends on availability of the product; wherein the normalized number of the products is normalized across a range of counts of products manufactured by the sites and across a range of counts of products manufactured by the site;
using the one or more processors, generating, and displaying on a display of a computer device, a tile interface comprising a plurality of tiles each corresponding to one site in the set of the sites, and comprising determining respective positions of the plurality of tiles where a first tile of the plurality of tiles corresponding to a first site associated with a greater normalized number of products is positioned in a first position and a second tile of the plurality of tiles corresponding to a second site associated with a lesser normalized number of products is positioned in a second position, determining respective colors of the plurality of tiles where the first tile of the plurality of tiles corresponding to the first site associated with a greater normalized adjusted lead time is shaded in a first color and the second tile of the plurality of tiles corresponding to the second site associated with a lesser normalized adjusted lead time is shaded in a second color.

9. The method of claim 8, further comprising:
using the one or more processors, identifying a third site of the sites that is downstream of the first site in the set of the sites in the supply chain;
using the one or more processors, determining a normalized number of products associated with the third site and a normalized adjusted lead time of the parts associated with the third site;
updating the tile interface to add a tile corresponding to the second site having a particular position based on the normalized number of products associated with the third site and a particular color based on the normalized adjusted lead time of the parts associated with the third site.

10. The method of claim 9, further comprising:
using the one or more processors, receiving an indication that the impact of the event is mitigated at the first site;
using the one or more processors, updating the tile interface by removing the tile corresponding to the first site and the tile corresponding to the third site;
using the one or more processors, for each remaining site in the set of the sites, determining an updated normalized number of products associated with the site and an updated normalized adjusted lead time of the parts associated with the site;
using the one or more processors, generating a second tile interface comprising a plurality of tiles each corresponding to one site in the remaining sites of the set of the sites.

11. The method of claim 8, further comprising:
using the one or more processors, receiving an instruction to re-generate the tile interface to correspond to the parts associated with the sites in the set of the sites;
using the one or more processors, generating a second tile interface comprising a plurality of tiles each corresponding to a part of the parts associated with the sites in the set of the sites, wherein each tile of the plurality of tiles includes a part name, and a number of products impacted by the event.

12. The method of claim 8, further comprising:
using the one or more processors, receiving an instruction to re-generate the tile interface to correspond to the products associated with the sites in the set of the sites;
using the one or more processors, generating a second tile interface comprising a plurality of tiles each corresponding to a product of the products associated with the sites in the set of the sites, wherein each tile of the plurality of tiles includes a product name, and a number of products impacted by the event.

13. The method of claim 8, further comprising:
using the one or more processors, detecting that a user has selected a tile of the tiles via the tile interface;
using the one or more processors, generating an information display including an emergency contact at the corresponding site, and an option to indicate that the site is mitigated.

14. The method of claim 8, further comprising:
using the one or more processors, determining that a first site of the set of the sites is a sole source for a first part impacted by the event;
using the one or more processors, in the tile interface, providing an indication that the first site is the sole source for the first part.

\* \* \* \* \*